United States Patent
Nishidate

(10) Patent No.: US 8,963,390 B2
(45) Date of Patent: Feb. 24, 2015

(54) SPINDLE MOTOR AND DISC DRIVE DEVICE

(75) Inventor: Masahiro Nishidate, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 292 days.

(21) Appl. No.: 13/564,914

(22) Filed: Aug. 2, 2012

(65) Prior Publication Data
US 2013/0193815 A1 Aug. 1, 2013

(30) Foreign Application Priority Data

Aug. 18, 2011 (JP) ................... 2011-178748
Aug. 18, 2011 (JP) ................... 2011-178749

(51) Int. Cl.
*H02K 7/10* (2006.01)

(52) U.S. Cl.
USPC ............... 310/75 R; 310/90; 310/67 R

(58) Field of Classification Search
USPC ........ 310/75 R, 90, 67 R; 720/604, 703, 704, 720/705, 706, 707
See application file for complete search history.

(56) References Cited

U.S. PATENT DOCUMENTS

| | | | | |
|---|---|---|---|---|
| 6,982,513 B2* | 1/2006 | Fujii et al. | ........ | 310/254.1 |
| 2002/0113503 A1* | 8/2002 | Nagatsuka | ........ | 310/67 R |
| 2004/0061404 A1* | 4/2004 | Fujii et al. | ........ | 310/216 |
| 2012/0185883 A1* | 7/2012 | Nishikata et al. | ........ | 720/604 |

FOREIGN PATENT DOCUMENTS

| JP | 2011-81866 | * 10/2009 | ........ G11B 17/028 |
|---|---|---|---|
| JP | 2010-170632 | 8/2010 | |

* cited by examiner

*Primary Examiner* — Hanh Nguyen
(74) *Attorney, Agent, or Firm* — Jordan and Hamburg LLP

(57) ABSTRACT

A spindle motor comprises a turntable, on which a disc is loaded, and a motor which rotates the turntable, wherein a top face plate of a magnetic body rotor case, which rotates united with a rotational shaft of the motor, serves as the turntable. A centering member that guides the inner edge of the disc so as to be concentric with the rotational shaft is disposed on the top face plate of the rotor case and a clamping magnet is disposed in a through-opening on the interior of the centering member and is in contact with the top face plate of the rotor case.

18 Claims, 22 Drawing Sheets

SPINDLE MOTOR AND DISC DRIVE DEVICE

BACKGROUND OF THE INVENTION

The present invention relates to a spindle motor for rotating an optical disc, magneto-optical disc or the like, and to a disc drive device that is provided with this spindle motor.

Disc drive devices equipped with head mechanisms for reading information recorded on a disc or writing information to a disc are known in the form of devices for optical discs such as CDs, DVDs and MDs, and for magneto-optical discs. As spindle motors used in such disc drive devices, external spindle motors, such as shown in FIG. 22, have been disclosed, for example in JP-2010-170632-A.

In the spindle motor 201 of FIG. 22, a disc supporting member (centering member) 203, which supports a disc 202 and is in contact with the inner edge of the center hole of the disc 202, is provided on the top face of a rotor holder (rotor case) 204. The disc supporting member 203 has a housing 203D comprising: a cylindrical portion 203A, which is fixed to the rotor holder 204; a planar portion 203B, which extends radially to the exterior from the bottom edge of the cylindrical portion 203A; and a guide 203C, which extends radially to the exterior from the planar portion 203B and guides the disc 202. A clamping magnet 206 and a back yoke 207 are disposed in the housing 203D. The clamping magnet 206 and the back yoke 207 serve to pull a magnetic body clamper 208, which is disposed on the top face of disc 202, toward the rotor holder.

In the spindle motor of FIG. 22, the back yoke 207 and the clamping magnet 206 are arranged stacked on the planar portion 203B of the disc supporting member 203; furthermore, with a view to reliably guiding the disc 202 by way of the guide 203C of the disc supporting member 203, it is common for the top edge of the guide 203C to be designed to be higher than the top face of the clamping magnet 206. Consequently, as the height from the top face of the rotor holder 204 to the top face of the clamping magnet 206 becomes greater, the height of the disc supporting member 203 becomes greater; the result is that the overall height of the spindle motor is greater.

Furthermore, when attempting to limit the height of the disc supporting member 203, the thickness of the clamping magnet 206 must be limited, but to limit the thickness while maintaining a prescribed attractive force, expensive magnets with a high magnetic flux density, such as rare earth magnets, must be used, and costs become higher.

SUMMARY OF THE INVENTION

The present invention is directed to solving the problems of the conventional technology, such as described above; and a first object thereof is to provide a spindle motor that can provide a lower profile, while a second object thereof is to provide a spindle motor that can be less expensive.

The spindle motor of the present invention is directed to achieving the above objects in that the spindle motor comprises a turntable, on which a disc is loaded, and a motor, which rotates the turntable, wherein a top face plate of a magnetic body rotor case, which rotates united with a rotational shaft of the motor, serves as the turntable, wherein a centering member, which guides the inner edge of the disc so as to be concentric with the rotational shaft, is disposed on the top face plate of the rotor case, and a clamping magnet is disposed in a through-opening on the interior of the centering member and is in contact with the top face plate of the rotor case.

The clamping magnet comprises an annular magnet and is disposed concentrically with the rotational shaft.

The inner circumference of the centering member is in contact with the outer circumference of the clamping magnet.

The rotational shaft has a protruding portion that protrudes from the top face plate of the rotor case, a cylinder member is fixed around the protruding portion, the inner circumference of the clamping magnet is in contact with the outer circumference of the cylinder member, and the clamping magnet is disposed concentrically with the rotational shaft.

The cylinder member has a flange that protrudes radially at the top outer circumference, and the flange faces, in the axial direction, the top face of the clamping magnet.

The centering member is provided with a projection that faces, in the axial direction, the top face of the clamping magnet.

The centering member comprises an annular guide that guides the inner edge of the disc, a boss that is disposed in the center of the annular guide, mounted around the rotational shaft, and a plurality of bridges that connect the annular guide and the boss, and the through-opening is formed between the annular guide and the boss.

The clamping magnet comprises an annular magnet and is disposed under the bridges.

The clamping magnet comprises an annular magnet, on the bottom face of which a recess is formed, and the clamping magnet is disposed on top of the bridges, with the recess fitting with the bridges.

The clamping magnet comprises a plurality of segmented magnets that are segmented in the rotational direction, the plurality of segmented magnets are disposed with gaps therebetween and the bridges are disposed in the gaps.

The said plurality of segmented magnets are arcuate magnets and are disposed in an annular shape with the gaps therebetween.

The said centering member is provided with projections that face, in the axial direction, the top faces of the plurality of segmented magnets.

The said rotational shaft has a protruding portion that protrudes from the top face plate of the rotor case, a cylinder member is fixed around the protruding portion, and the cylinder member faces, in the axial direction, the top faces of the plurality of segmented magnets.

The disc drive device of the present invention is a disc drive device that is provided with the spindle motor and comprises a clamper, which is disposed on the top face of the disc, and is attracted toward the rotor case by the clamping magnet, wherein the clamper has an annular protrusion that protrudes from the bottom face, and is positioned so that the inner circumference of the annular protrusion contacts the outer circumference of the flange on the cylinder member.

The disc drive device of the present invention is a disc drive device that is provided with the spindle motor and comprises a clamper, which is disposed on the top face of the disc, and is attracted toward the rotor case by said clamping magnet, wherein the clamper, which has an annular protrusion that protrudes from the bottom face, is positioned so that the outer circumference of the annular protrusion contacts the tip of the projection on the centering member.

The disc drive device of the present invention is a disc drive device that is provided with the spindle motor and comprises a clamper, which is disposed on the top face of the disc, and is attracted toward the rotor case by said clamping magnet, wherein the projections are provided on the inner circumference of the annular guide, and the clamper has an annular protrusion that protrudes from the bottom face, and is positioned so that the outer circumference of the annular protrusion contacts the tips of said projections.

The disc drive device of the present invention is a disc drive device that is provided with the spindle motor and comprises a clamper, which is disposed on the top face of the disc, and is attracted toward the rotor case by the clamping magnet, wherein the projections are provided on the outer circumference of the boss, and the clamper has an annular protrusion that protrudes from the bottom face, and is positioned so that the inner circumference of the annular protrusion contacts the tips of the projections.

The disc drive device of the present invention is a disc drive device that is provided with the spindle motor, and comprises a clamper, which is disposed on the top face of the disc, and is attracted toward the rotor case by said clamping magnet, wherein the clamper has an annular protrusion that protrudes from the bottom face, and is positioned so that the inner circumference of the annular protrusion contacts the outer circumference of the cylinder member.

According to the spindle motor of the present invention, because the centering member does not have a planar portion as in the conventional example, the clamping magnet can be disposed in direct contact with the top face plate of the rotor case; and the magnetic body rotor case serves as the back yoke, so that the back yoke of the conventional example need not be provided. Accordingly, the overall spindle motor can be given a lower profile, because the height from the rotor case top face to the clamping magnet top face is reduced and the height of the centering member can be reduced.

Furthermore, by virtue of the spindle motor of the present invention, when there is no need to limit the overall height of the spindle motor, a clamping magnet with a thickness greater than the conventional example can be used. Consequently, with a view to maintaining a prescribed attractive force, inexpensive ferrite magnets or the like can be used as material for the clamping magnet, in place of expensive rare earth magnets or the like, which have a strong magnetic attractive force; thus a lower cost spindle motor can be provided.

DESCRIPTION OF THE PREFERRED EMBODIMENTS

Hereafter, embodiments of the spindle motor and the disc drive device of the present invention are described with reference to the drawings, but the present invention is not limited to these embodiments, and the present invention can be practiced with suitable changes to the various component members or the like within the scope of the invention.

First Embodiment

Figure 1:
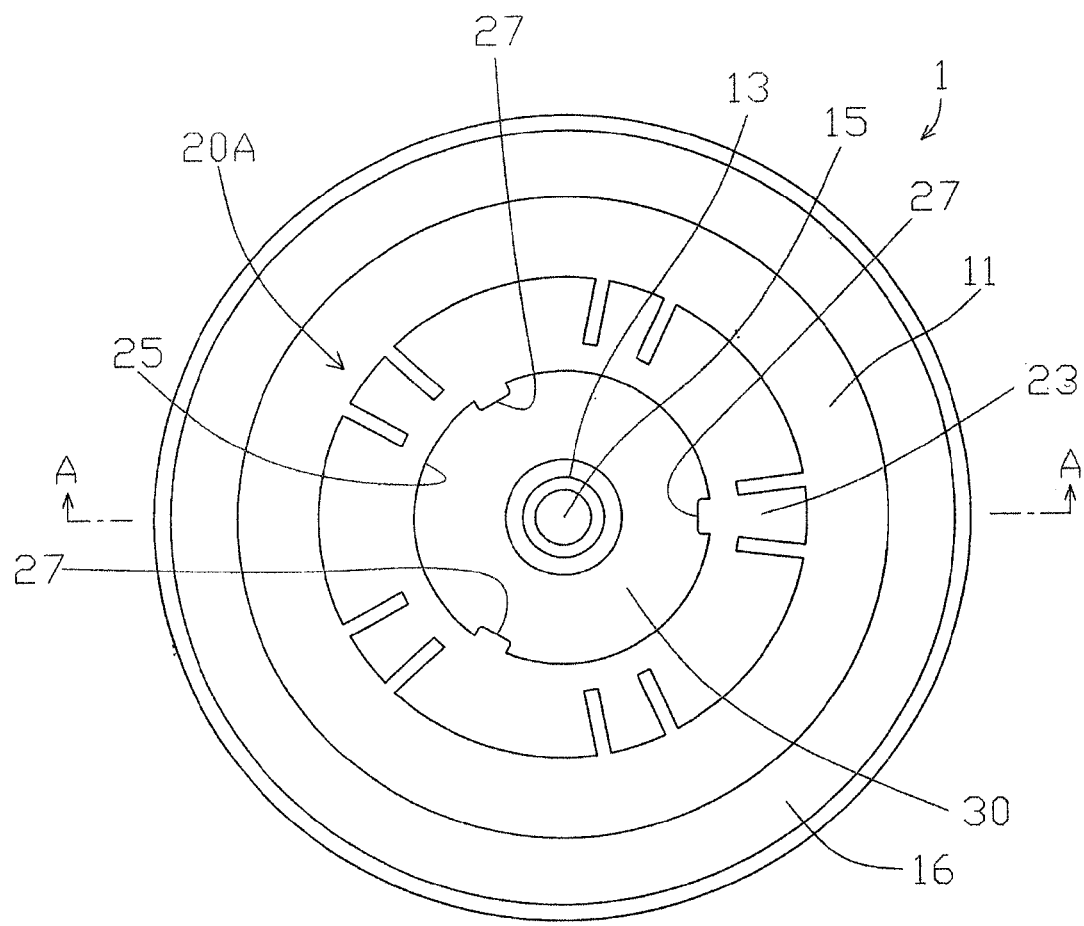
FIG. 1 is a plan view of a spindle motor according to a first embodiment of the present invention.
Figure 2:
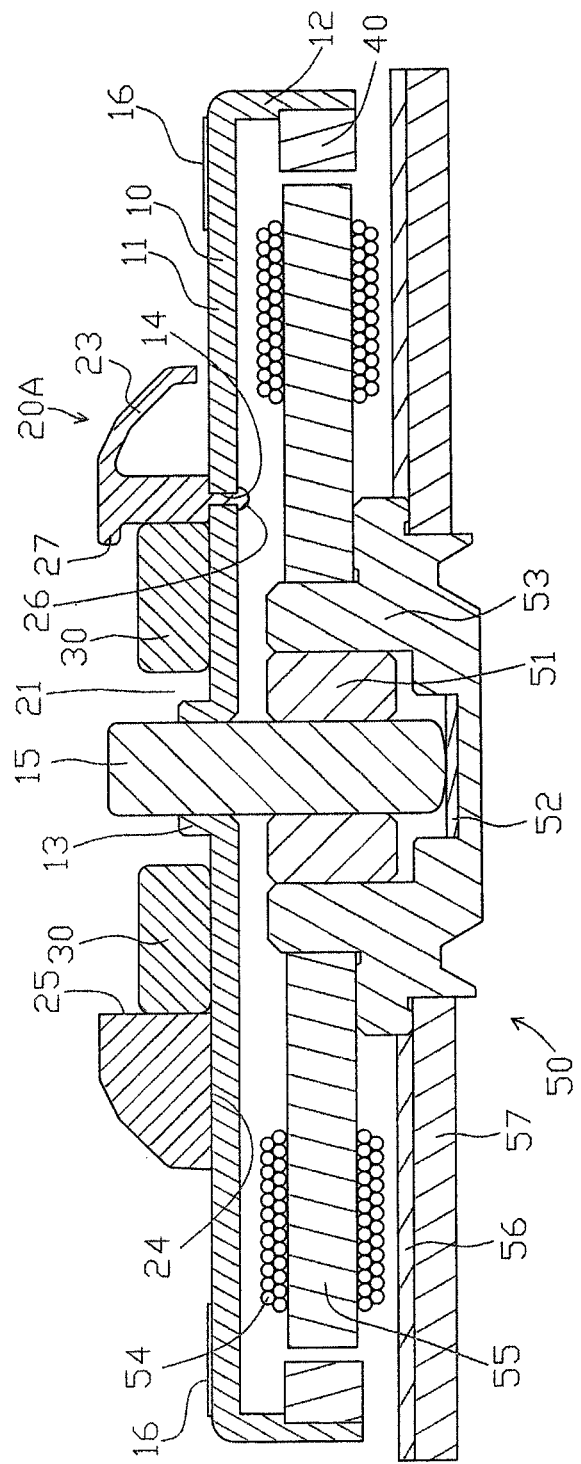
FIG. 2 is a sectional view at the arrows A-A in FIG. 1.

The configuration of a spindle motor according to a first embodiment of the present invention is described using FIG. 1 and FIG. 2.

FIG. 1 is a plan view of the spindle motor of this example. FIG. 2 is a sectional view at the arrows A-A in FIG. 1.

The spindle motor 1 of this example comprises a turntable, on which a disc is loaded, and a motor, which rotates the turntable, wherein a top face plate 11 of a magnetic body rotor case 10, which rotates united with a rotational shaft 15 of the motor, serves as the turntable.

As shown in FIG. 2, the spindle motor 1 of this example comprises the rotor case 10, the rotational shaft 15, a centering member 20A, a clamping magnet 30, a drive magnet 40, and a stator 50.

The rotor case 10 is formed in the shape of a cap, from a magnetic metal material. This rotor case 10 comprises the planar top face plate 11, which is formed as a plane perpendicular to the rotational shaft 15; a first cylindrical part 12, which is formed as a cylinder on the peripheral edge of the top face plate 11; and a second cylindrical part 13, which fixes the rotational shaft 15 in the center of the top face plate 11. The second cylindrical part 13 rises up in the axial direction of the top face plate 11.

The top face plate 11 of the rotor case 10 serves as the turntable, which rotates united with the rotational shaft 15, and on which a disc is removably disposed. A disc slip prevention member 16 is provided on the top face plate 11. Furthermore, three through-holes 14, which are equidistant from the rotational shaft 15 and at equal intervals in the rotational direction, are provided on the top face plate 11. Details are described below, but the protrusions 26 on the centering member 20A, which is described below, are inserted in these through-holes 14.

The rotational shaft 15 is press fitted in the second cylindrical part 13 of the rotor case 10, and is disposed so as to be protruding from the top face plate 11 of the rotor case 10. The rotational shaft 15 is supported in the stator 50, which is described below, in a state allowing rotation.

The centering member 20A is for guiding the disc concentrically with the rotational shaft 15, and is disposed on the top face plate 11 of the rotor case 10. The centering member 20A is formed in an annular shape, from a hard resin, and has a through-opening 21 at the interior thereof.

On the outer circumference of the centering member 20A, a plurality of claws 23 are provided at equal intervals in the rotational direction. This claw 23 is in contact with the inner edge of the central hole in the disc.

A bottom face 24 of the centering member 20A is formed into a planar shape and is in contact with the top face plate 11 of the rotor case 10.

On the top portion of the inner circumference 25 of the centering member 20A, a projection 27 is integrally provided, which approaches and faces the top face of the clamping magnet 30, which is described below, in the axial direction. Three projections 27 of the same shape are disposed at equal intervals in the rotational direction along the inner circumference of the centering member 20A.

With a view to guiding the disc concentrically with the rotational shaft 15, the centering member 20A must be disposed concentrically with the rotational shaft 15 on the top face plate 11 of the rotor case 10.

For this reason, on the bottom face 24 of the centering member 20A in this example, three protrusions 26 are provided equidistant from the center of the centering member 20A, at equal intervals in the rotational direction. The three protrusions 26 are respectively inserted into the three through-holes 14, which are provided in the top face plate 11. Thus, the centering member 20A is positioned on the rotor case 10 concentrically with the rotational shaft 15. Moreover, by crushing the protrusions 26, which have been inserted into the through-holes 14, by way of thermal compression bonding or the like, from underneath the top face plate 11, the centering member 20A is united with the rotor case 10.

The clamping magnet 30 is formed in an annular shape. The clamping magnet 30 is disposed in the through-opening 21 of the centering member 20A and is in contact with the top face plate 11 of the rotor case 10.

The outer diameter of the clamping magnet 30 is formed substantially equal to the inner diameter of the inner circumference 25 of the centering member 20A. Next, when the clamping magnet 30 is disposed in the through-opening 21 of the centering member 20A, the inner circumference 25 of the centering member 20A is in contact with the outer circumference of the clamping magnet 30. Thus, the clamping magnet 30 is positioned concentrically with the rotational shaft 15.

The drive magnet 40 is formed into a cylindrical shape, and is fixed to the inner circumference of the first cylindrical part 12 of the rotor case 10.

The stator 50 comprises a radial bearing 51 and a thrust bearing 52, which support the rotational shaft 15 rotatably, and a bearing holder 53, which holds the outer circumference of the radial bearing 51. Furthermore, the stator 50 comprises a stator core 55, which is fixed to the outer circumference of the bearing holder 53, and is disposed opposite to the drive magnet 40, a coil 54, which is wound on the stator core 55, and a stator base 57, on which a circuit board 56 is placed.

With the spindle motor 1 of this example configured in this way, the centering member 20A, which guides the inner edge of the disc concentrically with the rotational shaft 15, is disposed on the top face plate 11 of the rotor case 10; and the clamping magnet 30 is disposed in the through-opening 21 in the interior of the centering member 20A, so as to be in contact with the top face plate 11 of the rotor case 10.

Thus, the magnetic body rotor case serves as the back yoke of the clamping magnet, and the back yoke of the conventional example need not be provided. Accordingly, together with reducing the height from the rotor case top face to the clamping magnet top face, the entire spindle motor can be made to have a lower profile, because the height of the centering member can be reduced. Furthermore, because the centering member 20A is formed into an annular shape, in comparison to the conventional example, the manufacturing when forming the centering member is extremely easy and costs can be reduced, because the materials that form the centering member can be reduced.

Furthermore, when there is no need to limit the overall height of the spindle motor, a clamping magnet with a thickness greater than the conventional example can be used. Consequently, with a view to maintaining a prescribed attractive force, inexpensive ferrite magnets or the like can be used as material for the clamping magnet, in place of expensive rare earth magnets or the like, which have a strong magnetic attractive force; thus a less expensive spindle motor can be provided.

Furthermore, with the spindle motor 1 of this example, the clamping magnet 30 is constituted by an annular magnet, and is disposed concentrically with the rotational shaft 15. Consequently, a spindle motor with little eccentricity during rotation can be produced.

Furthermore, with the spindle motor 1 of this example, the inner circumference of the centering member 20A is in contact with the outer circumference of the clamping magnet 30. Consequently, by way of positioning either one of the centering member 20A and the clamping magnet 30 concentrically with the rotational shaft 15, the other can be automatically positioned concentrically with the rotational shaft 15, and a spindle motor with little eccentricity can be easily assembled.

Furthermore, with the spindle motor of the conventional example, because there is a planar portion 203B in the disc support member 203 (centering member), the clamping magnet 206 must be inserted from above the centering member into the housing 203D. With this type of structure, there is a risk that the clamping magnet 206 can easily come off when the spindle motor is operating or due to impact; to prevent this, a back yoke 207 must be bonded and fixed to the planar portion 203B, and the back yoke 207 must be bonded and fixed to the clamping magnet 206.

Meanwhile, with the spindle motor of the present invention, because there is no part corresponding to the planar portion 203B in the centering member, the clamping magnet can be disposed from underneath (the rotor case side) of the centering member. Consequently, the projection 27, which faces the top face of the clamping magnet 30 in the axial direction, can be provided on the centering member 20A, as in the spindle motor 1 of this example. Because this type of projection 27 provides a function of retaining the clamping magnet 30, which is in contact with the centering member 20A, a more reliable spindle motor can be produced, which does not require the clamping magnet to be fixed using an adhesive, which lacks thermal reliability.

Note that, in the first mode of embodiment, three projections 27, which are mutually separated, are formed on the centering member 20A, but this projection 27 can also be flange-shaped, projecting continuously in the rotational direction on the top portion of the inner circumference of the centering member 20A.

Furthermore, in this example, with the protrusions 26 inserted into the through-holes 14, the protrusions 26 are crushed by way of thermal compression bonding or the like, so that the centering member 20A cannot be removed from the rotor case 10, but the protrusion and the through-hole can be a snap fitting claw and a snap fitting hole and be fixed by snap-fitting. Thus, if a need to disassemble the spindle motor arises, the clamping magnet can easily be replaced, the remaining parts can be reused, and the cost of mass production can be reduced.

Note that the centering member can be positioned at the inner peripheral wall of a recess formed in the top face plate of the rotor case, or be positioned in the top face plate of the rotor case using a specialized tool.

Second Embodiment

Figure 3:
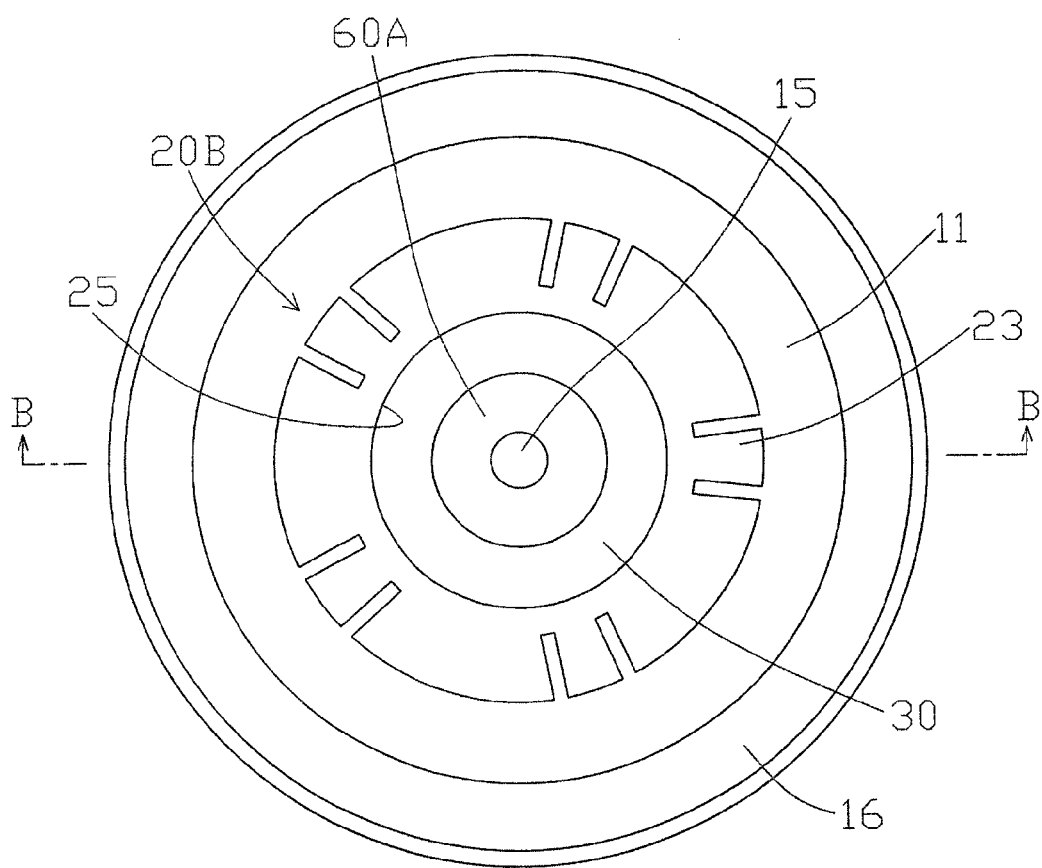
FIG. 3 is a plan view of a spindle motor according to a second embodiment of the present invention.
Figure 4:
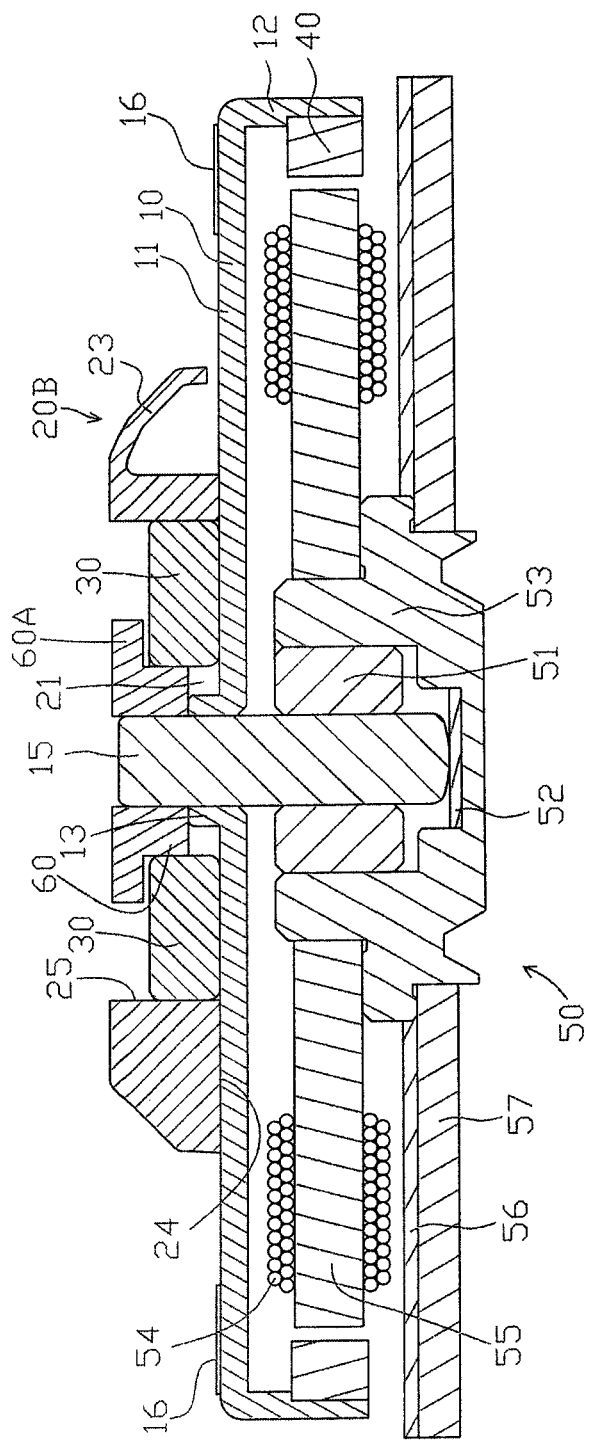
FIG. 4 is a sectional view at the arrows B-B in FIG. 3.

FIG. 3 is a plan view of a spindle motor according to a second embodiment of the present invention. FIG. 4 is a sectional view at the arrows B-B in FIG. 3. In FIG. 3 and FIG. 4, reference numerals that are the same as the reference numerals in FIG. 1 or FIG. 2 indicate the same members, and thus detailed descriptions are omitted.

In this example, the positioning mechanism for the centering member and the retaining mechanism for the clamping magnet differ from the first embodiment.

First, in terms of the positioning mechanism for the centering member, in the first embodiment, the clamping magnet is positioned in the inner circumference of the centering member that is fixed on the rotor case. Meanwhile, in this example, the clamping magnet 30 is positioned on the outer circumference of a cylinder member 60 that is fixed to the protruding portion of the rotational shaft, and furthermore, a centering member 20B is positioned at the outer circumference of the clamping magnet 30.

The cylinder member 60, which is cylindrical in shape, has a flange 60A, which is described hereafter, that protrudes in a radial direction at the top portion of the outer circumference. The bottom face of the cylinder member 60 is in contact with the top edge of the second cylindrical part 13 of the rotor case 10. The clamping magnet 30 is provided on the outer circumference of the cylinder member 60. The inner diameter of the clamping magnet 30 is formed to be substantially the same size as the outer diameter of the cylinder member 60; the inner circumference of clamping magnet 30 is in contact with the outer circumference of the cylinder member 60.

The centering member 20B is provided on the outer circumference of the clamping magnet 30. The centering member 20B of this example is in a shape that is not provided with the protrusion 26 of the first mode of embodiment on the bottom face. The inner diameter of the centering member 20B is formed to be substantially the same size as the outer diameter of the clamping magnet 30; the inner circumference of centering member 20B is in contact with the outer circumference of the clamping magnet 30.

Thus, with the clamping magnet 30 of this example, because the inner circumference thereof is in contact with the outer circumference of the cylinder member 60, the clamping magnet 30 can be positioned concentrically with a rotational shaft 15 and eccentricity does not occur during rotation.

Furthermore, with the centering member 20B, because the inner circumference thereof is in contact with the outer circumference of the clamping magnet 30, the centering member 20B can be positioned concentrically with a rotational shaft 15 and a disc can be mounted so that eccentricity does not occur. Consequently, by way of positioning either one of the centering member 20B and the clamping magnet 30 concentrically with the rotational shaft 15, the other can be automatically positioned concentrically with the rotational shaft 15, and a spindle motor with little eccentricity can be easily assembled.

Next, in terms of the retaining mechanism for the clamping magnet, in the first mode of embodiment, a retaining projection 27 is provided on the centering member 20A, which faces the top face of the clamping magnet 30 in the axial direction. In contrast, the retaining mechanism for the clamping magnet of this example is formed by way of the flange 60A, which protrudes in a radial direction, on the top portion of the outer circumference of the cylinder member 60 that is fixed on the rotational shaft 15. The flange 60A approaches and faces the top face the clamping magnet 30 in the axial direction.

Thus, the clamping magnet 30 is in contact with the outer circumference of the cylinder member 60, and the flange 60A provides a retaining function for the clamping magnet 30. Consequently, a more reliable spindle motor can be produced, which does not require the clamping magnet to be fixed using an adhesive, which lacks thermal reliability, as in the conventional example.

Note that, with the centering member 20B of the second embodiment, the projection 27, which is described in the first embodiment, can also be formed so as to face the top face of the clamping magnet 30 in the axial direction.

Third Embodiment

Figure 5:
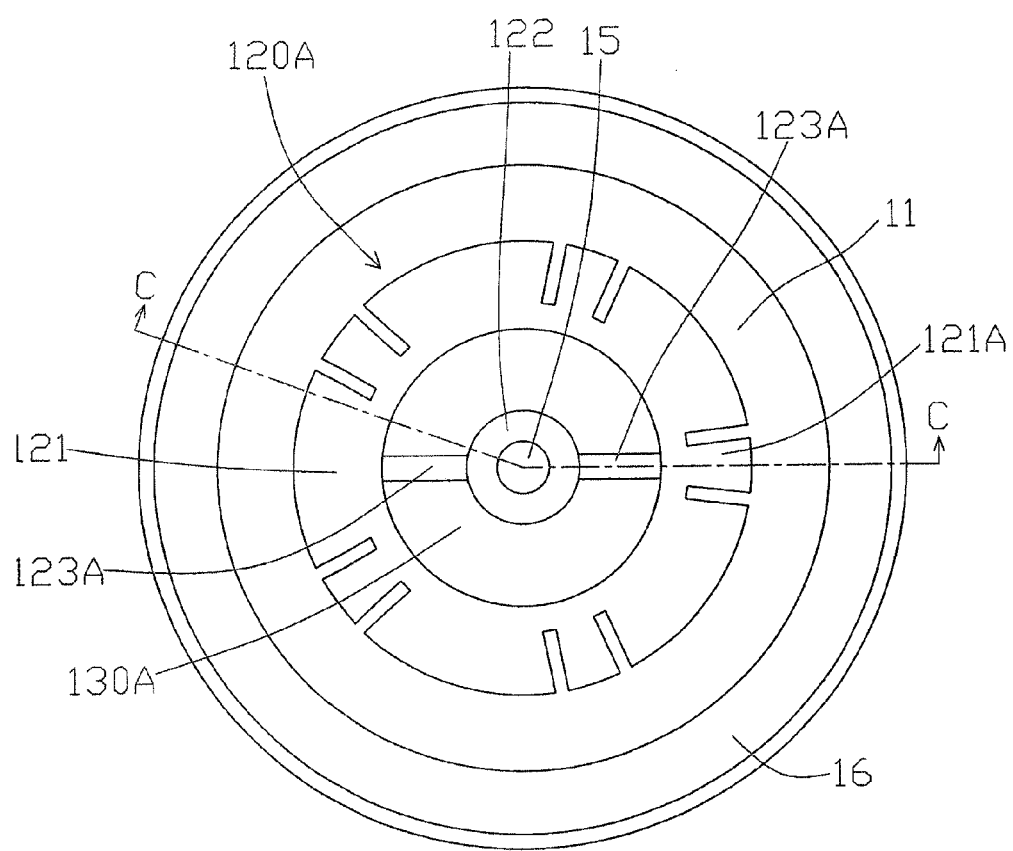
FIG. 5 is a plan view of a spindle motor according to a third embodiment of the present invention.
Figure 6:
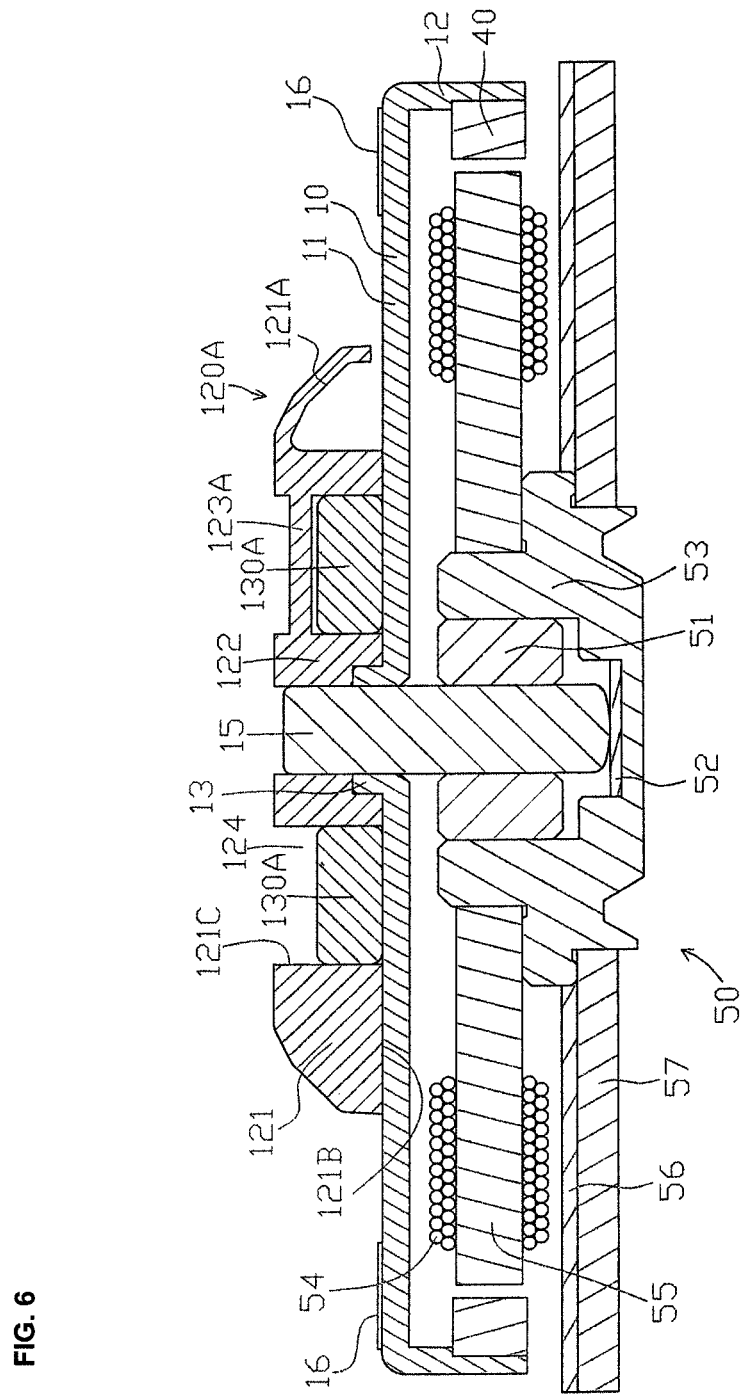
FIG. 6 is a sectional view at the arrows C-C in FIG. 5.

FIG. 5 is a plan view of a spindle motor according to a third embodiment of the present invention. FIG. 6 is a sectional view at the arrows C-C in FIG. 5. In FIG. 5 and FIG. 6, reference numerals that are the same as the reference numerals in FIG. 1 to FIG. 4 indicate the same members, and thus detailed descriptions are omitted.

In this example, the shape of the centering member and the positioning mechanism therefor, as well as the retaining mechanism for the clamping magnet, differ from the first embodiment of the present invention. Specifically, these are described below.

A centering member 120A of this example is integrally cast in a hard resin, and has an annular guide 121, which guides the inner edge of a disc.

On the outer circumference of the annular guide 121, a plurality of claws 121A are provided at equal intervals in the rotational direction. The claws 121A are in contact with the inner edge of the central hole in the disc.

The bottom face 121B of the annular guide 121 is formed into a planar shape and is in contact with the top face plate 11 of the rotor case 10.

Furthermore, centering member 120A is provided with a boss 122, which is mounted around the rotational shaft 15, and which is disposed in the center of the annular guide 121. The boss 122 is formed into a substantially cylindrical shape, and is disposed on the top part of the second cylindrical part 13 of the rotor case 10. The inner diameter of the boss 122 is formed so as to be equal to the outer diameter of the rotational shaft 15.

On the annular guide 121 and the boss 122, a plurality of bridges 123A are formed, which connect therebetween. The bridges 123A in this example connect the top portion of the inner circumference of the annular guide 121 and the top portion of the outer circumference of the boss 122, wherein one bridge is formed extending from the boss 122 in each of the leftward and rightward directions in FIG. 5. The bridges 123A are disposed so as not to be in contact with the top face plate 11 of the rotor case 10.

Between the annular guide 121 and the boss 122, a through-opening 124 is formed at the interior of the annular guide 121. In the through-opening 124, a clamping magnet 130A, described below, is disposed.

The clamping magnet 130A is formed in an annular shape. The clamping magnet 130A is disposed in the through-opening 124 of the centering member 120A. The clamping magnet 130A is in contact with the top face plate 11 of the rotor case 10. Furthermore, the clamping magnet 130A is disposed underneath the bridges 123A.

The outer diameter of the clamping magnet 130A is formed substantially equal to the inner diameter of the annular guide 121. The inner diameter of the clamping magnet 130A is formed substantially equal to the outer diameter of the boss 122. When the clamping magnet 130A is disposed in the through-opening 124 of the centering member 120A, the inner circumference 121C of the annular guide 121 and the outer circumference of the clamping magnet 130A are in contact.

In the spindle motor in this example, which is configured in this way, the centering member 120A is provided with: the annular guide 121 for guiding the inner edge of the disc; the boss 122, which is mounted around the rotational shaft 15, and which is disposed in the center of the annular guide 121; a plurality of bridges 123A for connecting the annular guide 121 and the boss 122; and the through-opening 124, which is between the annular guide 121 and the boss 122, and the clamping magnet 130A being disposed in the through-opening 124 and in contact with the top face plate 11 of the rotor case 10.

Thus, the magnetic body rotor case serves as the back yoke of the clamping magnet, and thus the back yoke need not be provided as it was in the conventional example. Accordingly, together with reducing the height from the rotor case top face to the clamping magnet top face, the entire spindle motor can be made to have a lower profile, because the height of the centering member can be reduced.

Furthermore, when there is no need to limit the overall height of the spindle motor, a clamping magnet with a thickness greater than the conventional example can be used. Consequently, with a view to maintaining a prescribed attractive force, inexpensive ferrite magnets or the like can be used as material for the clamping magnet, in place of expensive rare earth magnets or the like, which have a strong magnetic attractive force; thus a lower cost spindle motor can be provided.

Furthermore, because the centering member 120A is provided with the boss 122, which is mounted around a rotational shaft 15, and which is disposed in the center of the annular guide 121, a centering member can be easily and reliably positioned concentrically with a rotational shaft, as in the conventional example.

Furthermore, the clamping magnet 130A is constituted by an annular magnet and is disposed underneath the bridges 123A. Because the bridges 123A have a retaining function with respect to the clamping magnet 130A, which is in contact with the inner circumference of the annular guide 121, a more reliable spindle motor can be produced.

Fourth Embodiment

Figure 7:
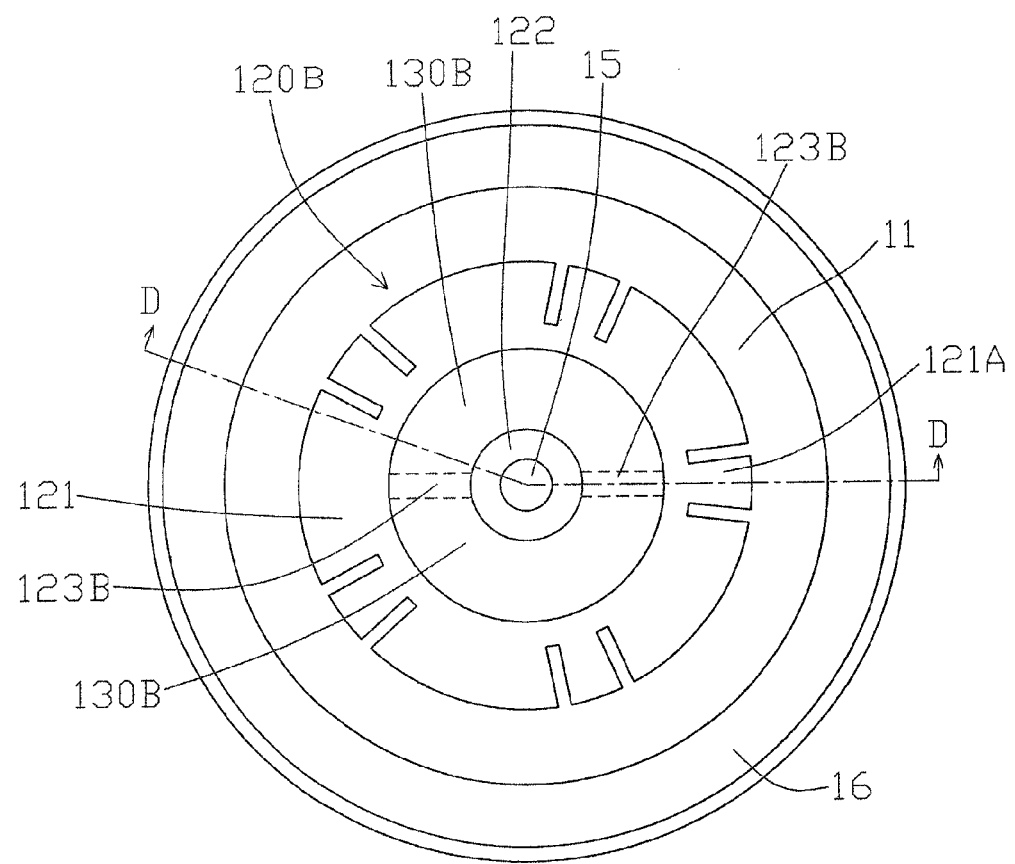
FIG. 7 is a plan view of a spindle motor according to a fourth embodiment of the present invention.
Figure 8:
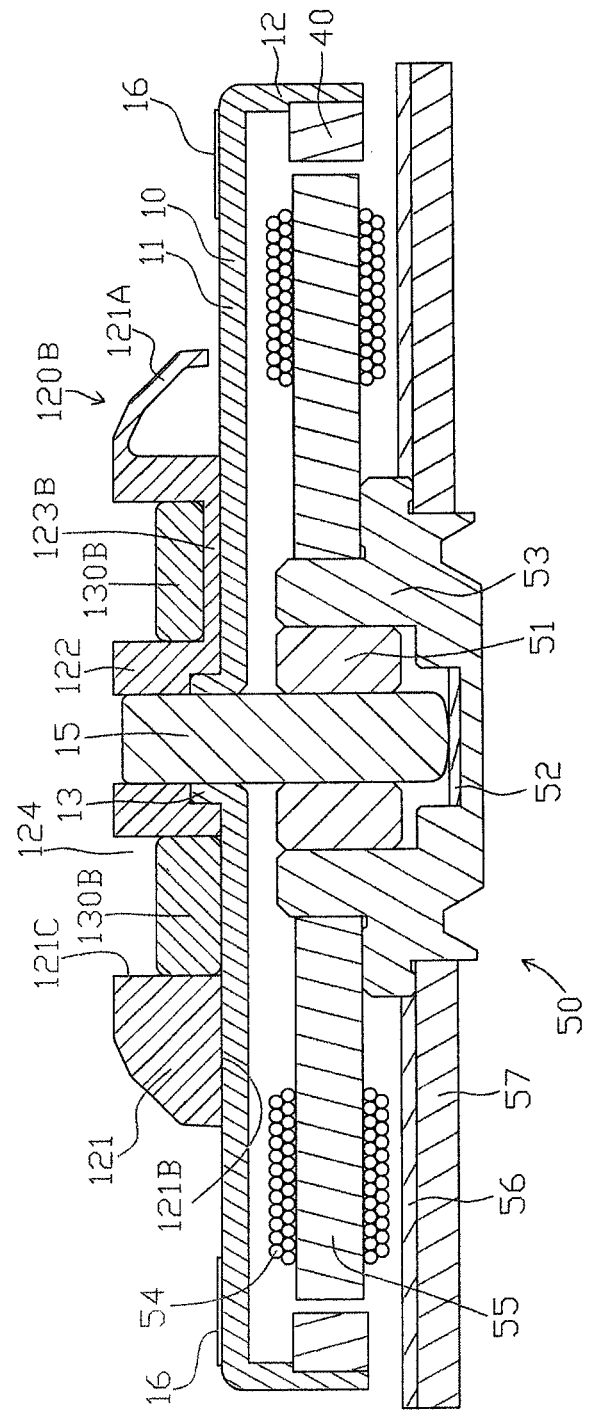
FIG. 8 is a sectional view at the arrows D-D in FIG. 7.
Figure 9:
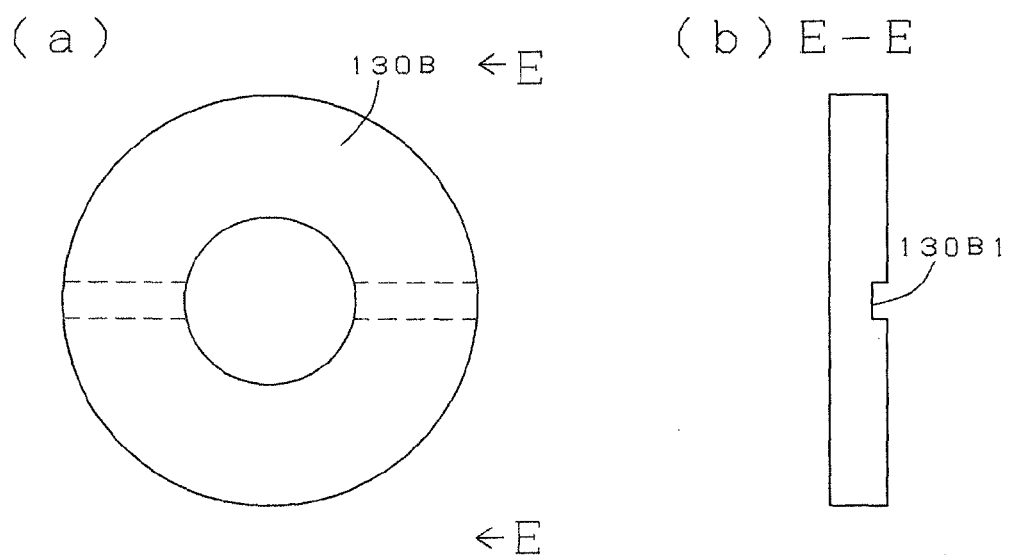
FIG. 9(a) is a plan view of a clamping magnet according to a fourth embodiment of the present invention.
FIG. 9(b) is a side view at the arrows E-E in FIG. 9(a).

FIG. 7 is a plan view of a spindle motor according to a fourth embodiment of the present invention. FIG. 8 is a sectional view at the arrows D-D in FIG. 7. FIG. 9(a) is a plan view of a clamping magnet according to the fourth embodiment of the present invention. FIG. 9(b) is a side view at the arrows E-E in FIG. 9(a). In FIG. 7 to FIG. 9, reference numerals that are the same as the reference numerals in FIG. 1 to FIG. 6 indicate the same members, and thus detailed descriptions are omitted.

In this example, the position of the bridge on the centering member and the shape of the clamping magnet differ from the third embodiment.

The bridges 123A of the third embodiment connect the top portion of the inner circumference of the annular guide 121 and the top portion of the outer circumference of the boss 122, and are disposed so as not to be in contact with the top face plate 11 of the rotor case 10; but in this example, bridges 123B connect the bottom portion of the inner circumference of the annular guide 121 and the bottom portion of the outer circumference of the boss 122, and are disposed so as to be in contact with the top face plate 11 of the rotor case 10.

Furthermore, in the third mode of embodiment, a clamping magnet 130A is constituted by an annular magnet and is disposed underneath the bridges 123A; but in this example, a clamping magnet 130B is constituted by an annular magnet with a recess 130B1 formed on the bottom face thereof. Specifically, the recess 130B1 is formed on the bottom face of the clamping magnet 130B in FIG. 9, in the right-left direction in the figure. The shape of the interior of the recess 130B1 is formed so as to be the same as the profile of the bridge 123B so that the recess 130B1 can fit with the bridge 123B.

The clamping magnet 130B is inserted in the through-opening 124 of the centering member 120B from above. The clamping magnet 130B is in contact with the top face plate 11 of the rotor case 10, while the recess 130B1 is fit with the bridge 123B and is disposed on top of the bridge 123B.

As this example has this type of configuration, and the magnetic body rotor case serves as the back yoke of the clamping magnet, the back yoke of the conventional example need not be provided. Accordingly, together with reducing the height from the rotor case top face to the clamping magnet top face, the entire spindle motor can be made to have a lower profile because the height of the centering member can be reduced.

Furthermore, when there is no need to limit the overall height of the spindle motor, a clamping magnet with a thickness greater than the conventional example can be used. Consequently, with a view to maintaining a prescribed attractive force, inexpensive ferrite magnets or the like can be used as material for the clamping magnet, in place of expensive rare earth magnets or the like, which have a strong magnetic attractive force; thus a less expensive spindle motor can be provided.

Furthermore, because the centering member 120B has the boss 122, which is mounted around a rotational shaft 15, and which is disposed in the center of the annular guide 121, the centering member can be easily and reliably positioned concentrically with a rotational shaft, as in the conventional example.

Furthermore, the recess 130B1 is fit with the bridge 123B and is disposed on top of the bridge 123B. Thus, after the clamping magnet 130B is inserted into the through-opening 124 of the centering member 120B from above, and the centering member is fixed to the rotational shaft, the clamping magnet can be disposed in the through-opening of the centering member, so that assembly can be easily performed, as in the conventional example.

Furthermore, when the recess in the clamping magnet and the bridges of the centering member are fit together, they function as a retainer for the clamping magnet, and a more reliable spindle motor can be produced.

Fifth Embodiment

Figure 10:
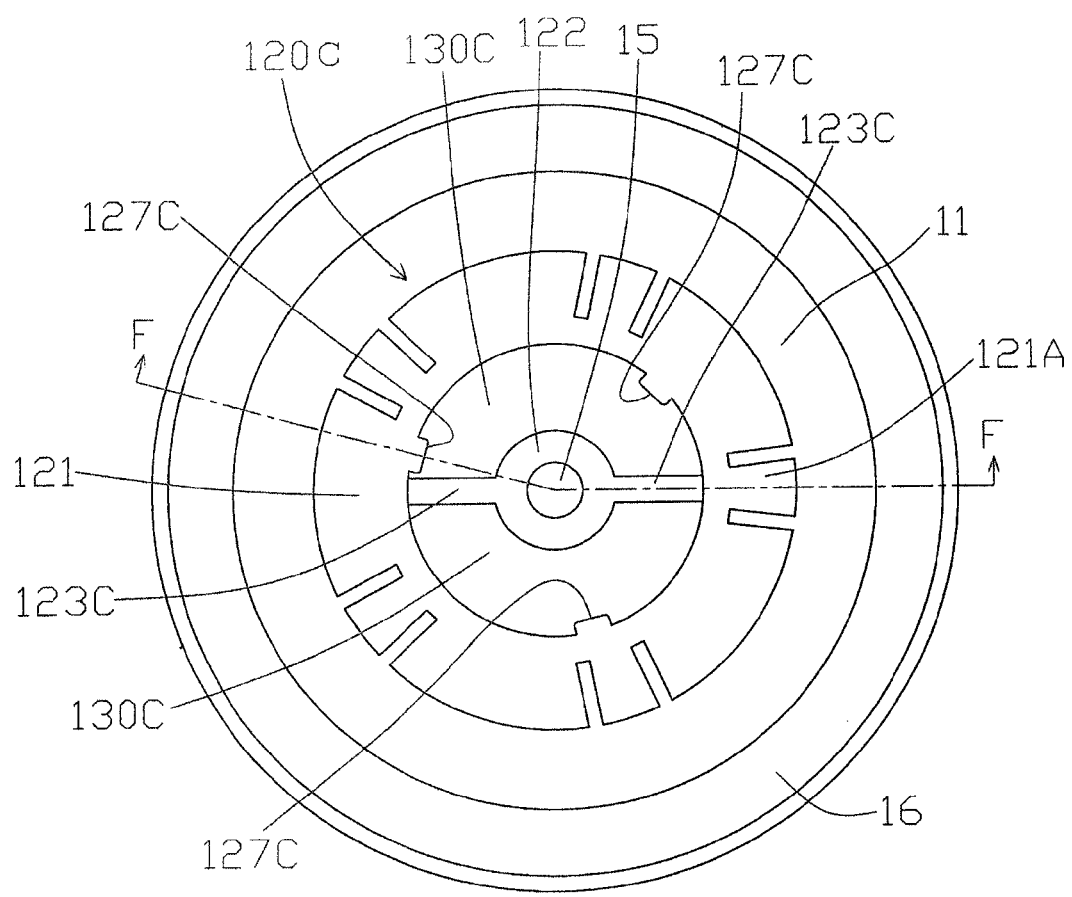
FIG. 10 is a plan view of a spindle motor according to a fifth embodiment of the present invention.
Figure 11:
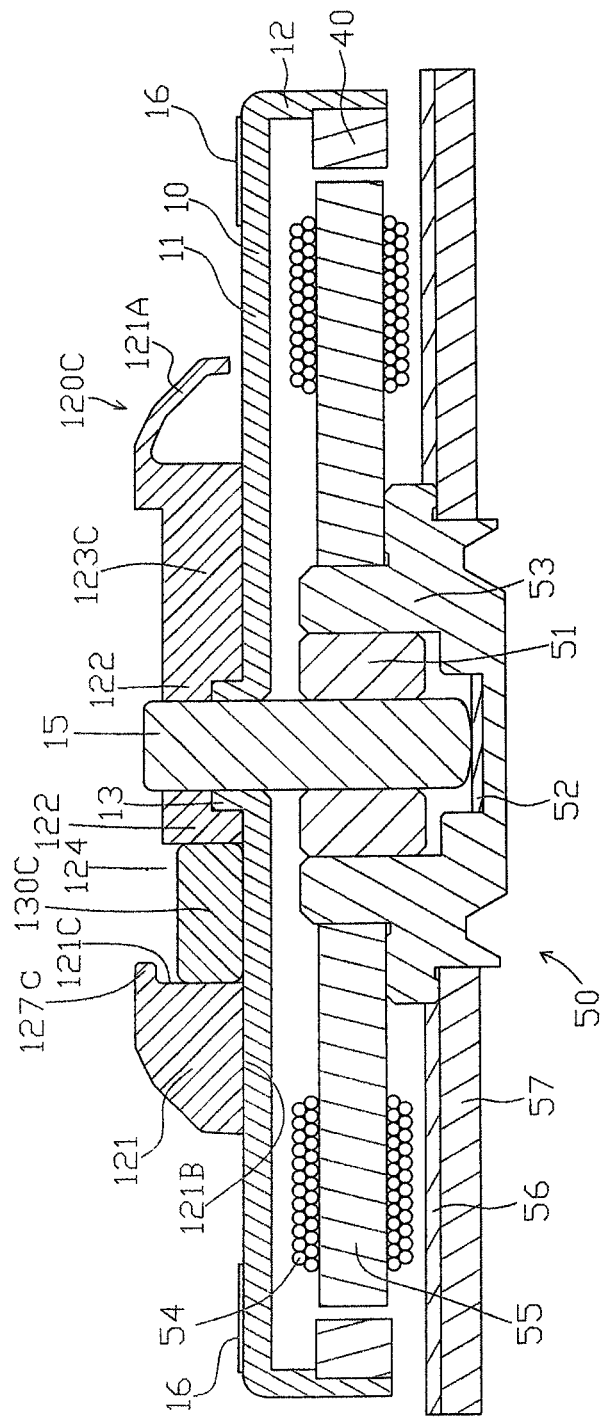
FIG. 11 is a sectional view at the arrows F-F in FIG. 10.

FIG. 10 is a plan view of a spindle motor according to a fifth embodiment of the present invention. FIG. 11 is a sectional view at the arrows F-F in FIG. 10. In FIG. 10 and FIG. 11, reference numerals that are the same as the reference numerals in FIG. 1 to FIG. 9 indicate the same members, and thus detailed descriptions are omitted.

In this example, the bridge of the centering member and the shape of the clamping magnet differ from the third embodiment.

In the third embodiment, the bridge 123A connects the top portion of the inner circumference of the annular guide 121 and the top portion of the outer circumference of the boss 122; but in this example, a bridge 123C is a connecting wall that connects the inner circumference of the annular guide 121 and the outer circumference of the boss 122. The top portion of the connecting wall connects the top portion of the inner circumference of the annular guide 121 and the top portion of the outer circumference of the boss. The bottom portion of the connecting wall connects the bottom portion of the inner circumference of the annular guide 121 and the bottom portion of the outer circumference of the boss. Two through-openings 124 in this example are divided by the bridge (connecting wall) 123C, being formed between the annular guide 121 and the boss 122.

Furthermore, in the third embodiment, the clamping magnet 130A is an annular magnet, but a clamping magnet 130C of this example comprises a plurality of segmented magnets, which are segmented in the rotational direction. The plurality of segmented magnets of this example is constituted by arcuate magnets. When the plurality of segmented magnets are respectively disposed in the through-openings 124, these are disposed in an annular shape with a gap therebetween, and the aforementioned bridge 123C is disposed in the gap. In this example, two arcuate magnets are respectively disposed in two through-openings 124 so as to be disposed in an annular shape with a gap therebetween, and the aforementioned bridge 123C is disposed in the gap. Three or more bridges 123C can also be provided at equal intervals in the rotational direction, and a plurality of segmented magnets corresponding to the number of bridges 123C can also be disposed in an annular shape in the respective through-openings 124. The outer diameter of the plurality of segmented magnets that have been disposed in an annular shape is formed to substantially be the same size as the inner diameter of the annular guide 121. Furthermore, the inner diameter of the plurality of segmented magnets that have been disposed in an annular shape is formed to be substantially the same size as the outer diameter of the boss 122. The top portion of the inner circumferential face of the annular guide 121 is provided with projections 127C, which approach and face the top faces of the plurality of segmented magnets in the axial direction. Three projections 127C are disposed at equal intervals in the rotational direction, along the inner circumference of the annular guide 121. The projections 127C and bridges 123C are disposed so as not to overlap, as in the plan view of FIG. 10.

In this example, as this was formed in this manner, when the plurality of segmented magnets are respectively disposed in the through-openings 124 of the centering member 120C, the plurality of segmented magnets are in contact with the top face plate 11 of the rotor case 10.

Thus, the magnetic body rotor case serves as the back yoke of the clamping magnet, and the back yoke of the conventional example need not be provided. Accordingly, together with reducing the height from the rotor case top face to the clamping magnet top face, the entire spindle motor can be made to have a lower profile because the height of the centering member can be reduced.

Furthermore, when there is no need to limit the overall height of the spindle motor, a clamping magnet with a thickness greater than the conventional example can be used. Consequently, with a view to maintaining a prescribed attractive force, inexpensive ferrite magnets or the like can be used as material for the clamping magnet, in place of expensive rare earth magnets or the like, which have a strong magnetic attractive force; thus a less expensive spindle motor can be provided.

Furthermore, because the centering member 120C has the boss 122, which is disposed in the center of the annular guide 121, and is mounted around the rotational shaft 15, the centering member can be easily and reliably positioned concentrically with a rotational shaft, as in the conventional example.

Furthermore, when the plurality of segmented magnets are respectively disposed in the through-openings 124 of the centering member 120C, the inner circumference of the annular guide and the outer circumferences the plurality of segmented magnets are in contact, so that the plurality of segmented magnets that have been disposed in an annular shape are positioned concentrically with the rotational shaft, and thus eccentricity does not occur during rotation.

Furthermore, the clamping magnet in this example comprises a plurality of segmented magnets that are segmented in the rotational direction, the plurality of segmented magnets being disposed with gaps therebetween, and the bridges 123C being disposed in the gaps. Thus, the magnetic attractive force of a clamper that is attracted toward a rotor case can be adjusted by way of increasing the number of segmented clamping magnets.

Furthermore, the centering member is provided with the projections 127C, which face the top faces of the plurality of segmented magnets in the axial direction. Because the projections 127C have a retaining function with respect to the plurality of segmented magnets that are in contact with the inner circumference of the annular guide, a more reliable spindle motor can be produced.

Note that the three separated projections 127C can also be flange-shaped, projecting continuously in the rotational direction at the top portion of the inner circumference the annular guide 121.

Sixth Embodiment

Figure 12:
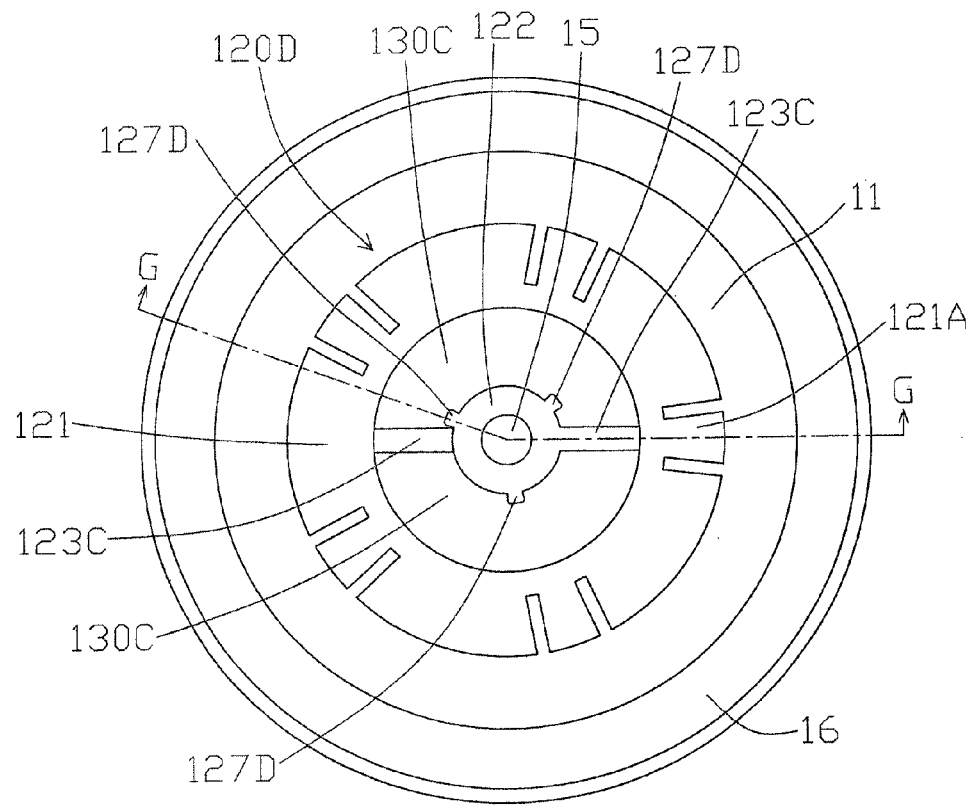
FIG. 12 is a plan view of a spindle motor according to a sixth embodiment of the present invention.
Figure 13:
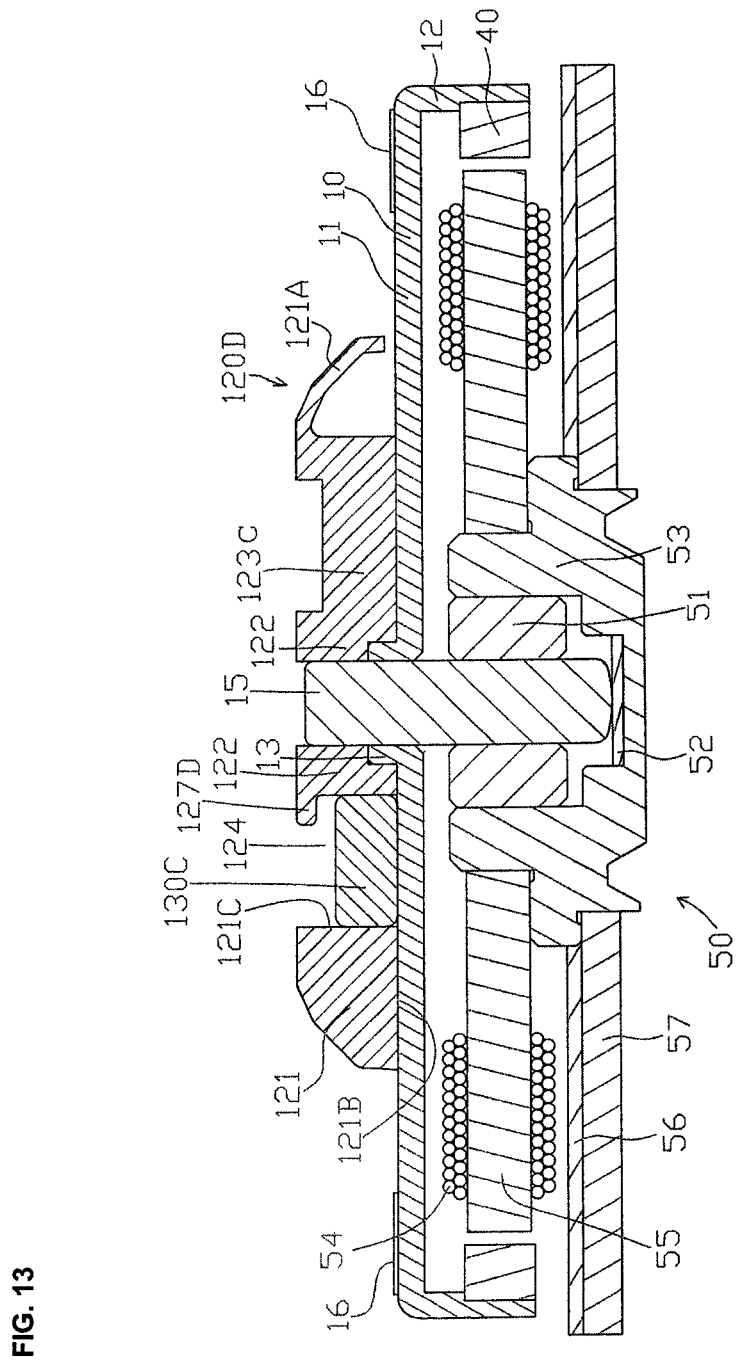
FIG. 13 is a sectional view at the arrows G-G in FIG. 12.

FIG. 12 is a plan view of a spindle motor according to a sixth embodiment of the present invention. FIG. 13 is a sectional view at the arrows of line G-G in FIG. 12. In FIG. 12 and FIG. 13, reference numerals that are the same as the reference numerals in FIG. 1 to FIG. 11 indicate the same members, and thus detailed descriptions are omitted.

In this example, the position of the projection for retaining the clamping magnet differs from the fifth embodiment. In the description of the fifth embodiment, the three projections 127C of the centering member 120C are disposed at the top portion of the inner circumference of the annular guide 121, but in this example, three projections 127D are provided at equal intervals in the rotational direction along the outer circumference of a boss 122. These projections 127D face the top faces of a plurality of segmented magnets in the axial direction. These projections 127D and bridges 123C are disposed so as not to overlap, as in the plan view of FIG. 12.

In this example, an effect similar to the fifth mode of embodiment is likewise provided. That is to say, when the inner circumference of a plurality of segmented magnets is in contact with the outer circumference of the boss 122, because the projections 127D have a retaining function with respect to a clamping magnet 130C, a more reliable spindle motor can be produced.

Seventh Embodiment

Figure 14:
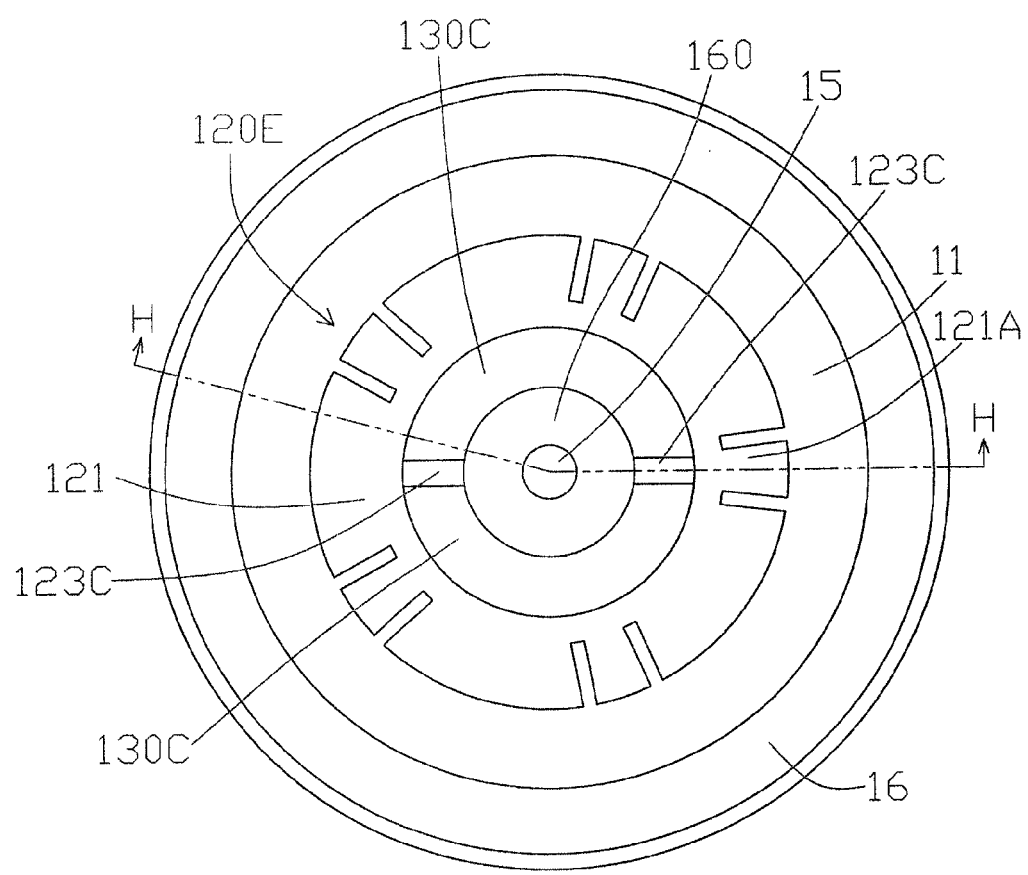
FIG. 14 is a plan view of a spindle motor according to a seventh embodiment of the present invention.
Figure 15:
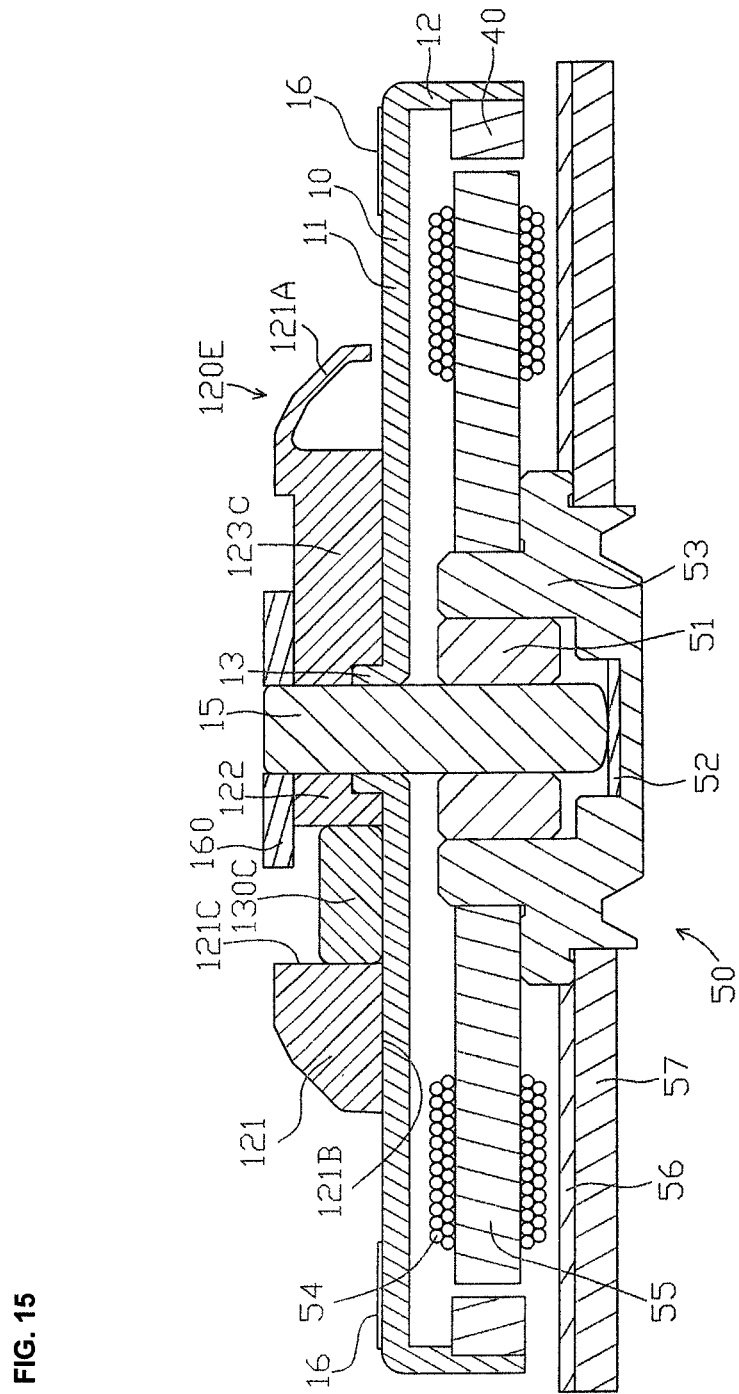
FIG. 15 is a sectional view at the arrows H-H in FIG. 14.

FIG. 14 is a plan view of a spindle motor according to a seventh embodiment of the present invention. FIG. 15 is a sectional view at the arrows of line H-H in FIG. 14. In FIG. 14 and FIG. 15, reference numerals that are the same as the reference numerals in FIG. 1 to FIG. 13 indicate the same members, and thus detailed descriptions are omitted.

In this example, the retaining mechanism for the plurality of segmented magnets differs from the sixth mode of embodiment. In the sixth mode of embodiment, three projections 127D are disposed at equal intervals in the rotational direction along the outer circumference of a boss 122, but in this example, a cylinder member 160 is disposed at the periphery of the protruding portion of the rotational shaft 15 that protrudes from the top face plate 11 of the rotor case 10.

The cylinder member 160 is formed from a non-magnetic metal material, and the outer diameter of the cylinder member 160 is formed so as to be larger than the outer diameter of the boss 122. After the plurality of segmented magnets have been disposed on the top face plate 11 of the rotor case 10, the cylinder member 160 is brought into contact with the top face of the boss 122 and is fixed to the rotational shaft 15.

Because this example is formed in this way, and the inner circumference of the plurality of segmented magnets is in contact with the outer circumference of the boss, the cylinder member serves as a retainer for the plurality of segmented magnets. Thus, a more reliable spindle motor, with which the plurality of segmented magnets do not separate from the rotor case, can be provided.

Figure 16:
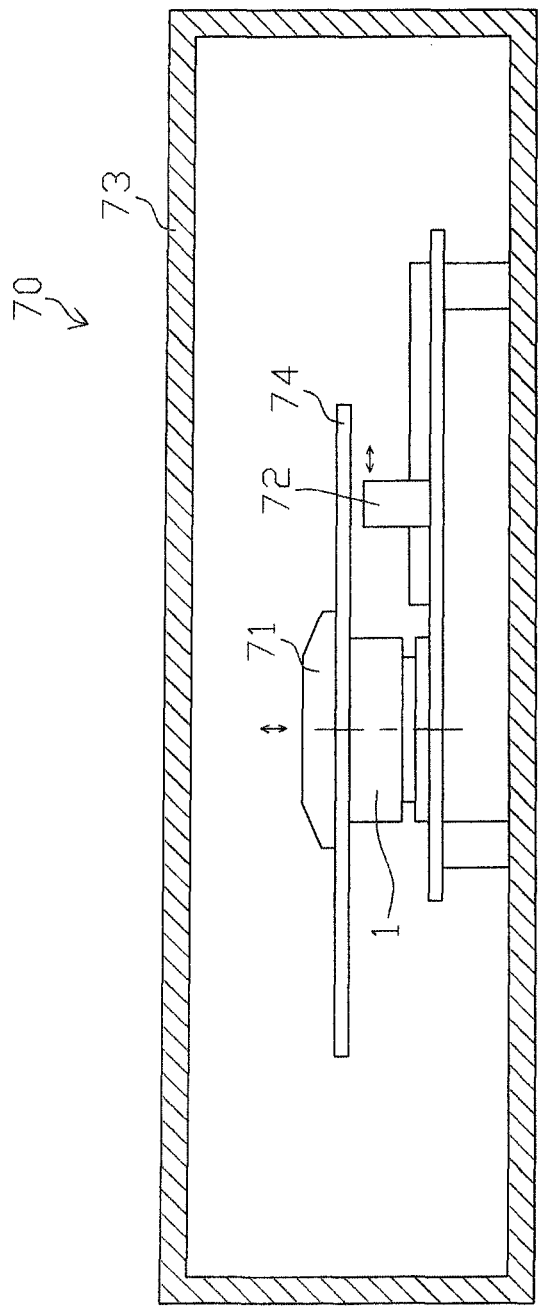
FIG. 16 is a sectional view of one example of a disc drive device of the present invention.
Figure 17:
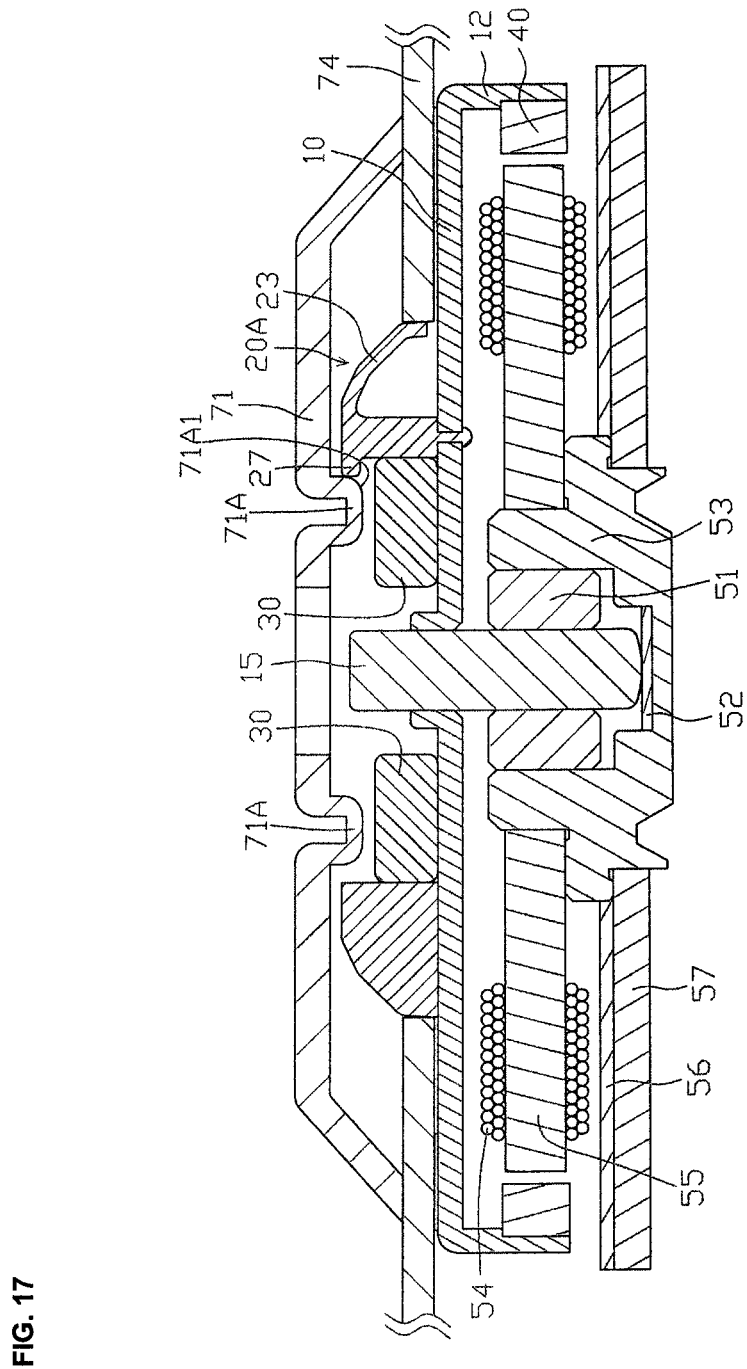
FIG. 17 is a sectional view of key elements of a disc drive device, which is provided with the spindle motor according to the first embodiment of the present invention.

Next, a disc drive device of the present invention is described. FIG. 16 is a sectional view of one example of a disc drive device of the present invention. FIG. 17 is a sectional view of key elements the disc drive device, which is provided with the spindle motor according to the first embodiment of the present invention. In FIG. 16 and FIG. 17, reference numerals that are the same as the reference numerals in FIG. 1 to FIG. 15 indicate the same members, and thus detailed descriptions are omitted.

A disc drive device 70 comprises the spindle motor 1 of the present invention, a clamper 71, a recording and playback unit 72, and a case 73.

The clamper 71, which is formed from a magnetic body, and which is disposed in contact with the top face of a disc, is pulled toward a rotor case by way of the clamping magnet 30 of the spindle motor 1. The clamper 71 is provided with an annular protrusion 71A, which protrudes from the bottom face and is formed concentrically from the center of rotation.

The recording and playback unit 72 causes an optical pickup, which is not represented, to be moved along the recording face of a disc, which is rotated by way of the spindle motor 1, and reads information from a disc 74 or writes information to the disc 74.

The case 73 is internally provided with the spindle motor 1, the clamper 71, the recording and playback unit 72 and the like.

Next, in terms of a centering member 20A of the disc drive device shown in FIG. 17, the center of the inscribed circle that touches the tips of the three separated projections 27 is the center of rotation. The outer diameter of the annular protrusion 71A is the same size as the inscribed circle. When the clamper 71 is moved down in the axial direction from above the disc 74, the outer circumference of the annular protrusion 71A makes contact with the tips of the projections 27 on the centering member 20A so as to be centered.

Thus, the projections 27 have a centering function for the clamper 71, so that a disc drive device is produced with which there is no eccentricity when the clamper 71, which is disposed on the top face of the disc, rotates. No less than three projections 27 are preferable for forming the inscribed circle, which is inscribed at the tips thereof.

Furthermore, the annular protrusion 71A of the centered clamper 71 is disposed opposite to, and not in contact with, the top face of a clamping magnet 30, so that a clearance is provided therebetween. Consequently, when the clamper 71 is moved up in the axial direction so as to be separated from the clamping magnet 30, because there is the aforementioned clearance, the attractive force between the clamping magnet 30 and the annular protrusion 71A is weaker than the attractive force between the clamping magnet 30 and a rotor case 10. Thus, the clamping magnet 30 can be fixed so that it does not move up in the axial direction from the rotor case 10, without being bonded.

Moreover, because retaining projections 27 are provided at the top face of the clamping magnet 30, a disc drive device can be produced that is provided with a more reliable spindle motor, wherein the clamping magnet is reliably prevented from coming off from the rotor case.

Furthermore, if a convex rounded portion 71A1 is formed between the outer circumference of the annular protrusion 71A and the bottom portion that continues on the outer circumference thereof, when the clamper 71 is moved down in the axial direction from above the disc 74, the clamper 71 is smoothly brought into in contact with the tips of the projections 27 on the centering member 20A, and thus a disc drive device, which can easily perform centering, can be produced.

Figure 18:
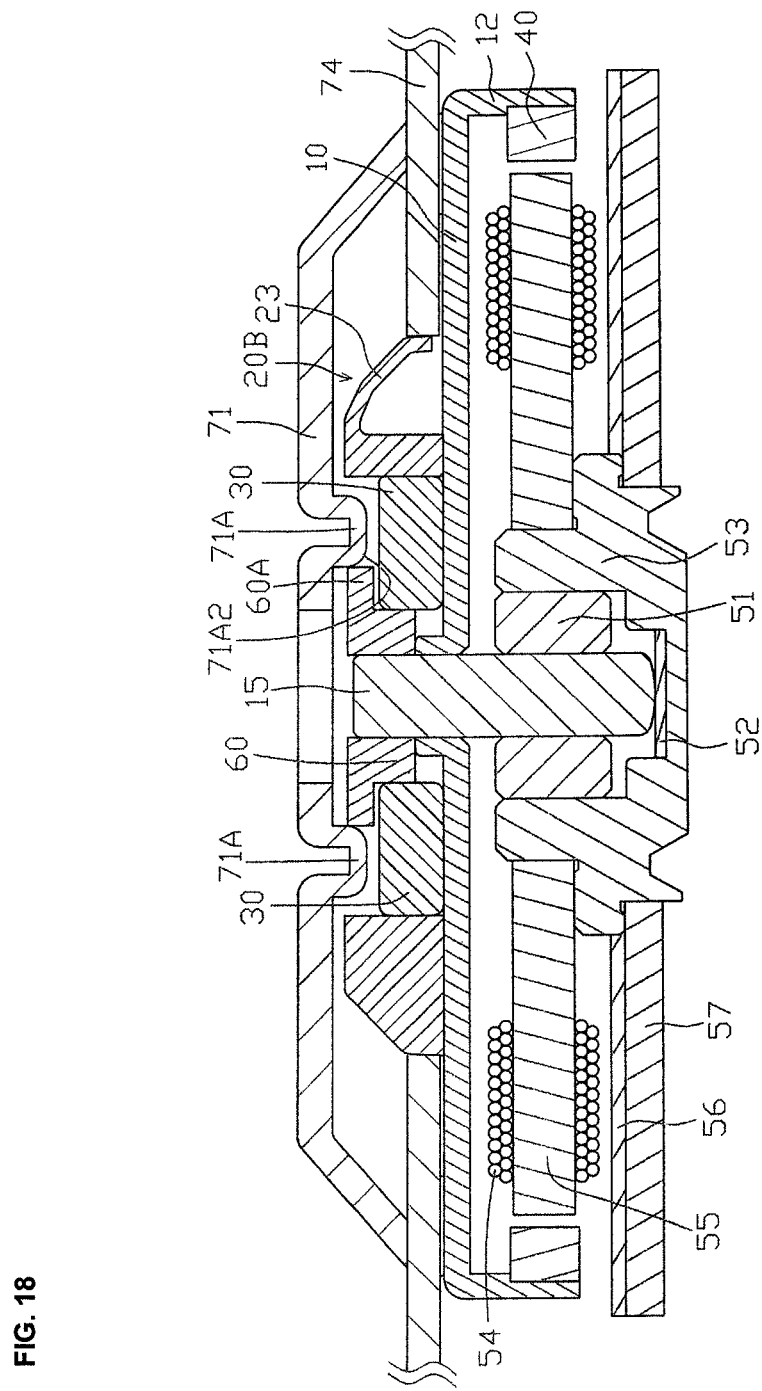
FIG. 18 is a sectional view of key elements of a disc drive device, which is provided with the spindle motor according to the second embodiment of the present invention.

FIG. 18 is a sectional view of key elements of a disc drive device, which is provided with the spindle motor according to the second embodiment of the present invention. In FIG. 18, reference numerals that are the same as the reference numerals in FIG. 1 to FIG. 17 indicate the same members, and thus detailed descriptions are omitted.

In the disc drive device shown in FIG. 18, the center of the outer diameter of a flange 60A is the center of rotation, and the inner diameter of an annular protrusion 71A is the same size as the outer diameter of the flange 60A. Consequently, a clamper 71 is above the disc 74 and when moved down in the axial direction, the inner circumference of the annular protrusion 71A of the clamper 71 is brought into contact with the outer circumference of flange 60A so as to be centered. Thus, the flange 60A has a centering function for the clamper 71, so that a disc drive device is produced with which there is no eccentricity when the clamper 71, which is disposed on the top face of the disc 74, rotates.

Furthermore, the annular protrusion 71A of the centered clamper 71 is disposed opposite to, and not in contact with, the top face of a clamping magnet 30 so that a clearance is provided. Consequently, when the clamper 71 is moved up in the axial direction so as to be separated from the clamping magnet, because there is the aforementioned clearance, the attractive force between the clamping magnet 30 and the annular protrusion 71A is weaker than the attractive force between the clamping magnet 30 and a rotor case 10. Thus, the clamping magnet 30 can be fixed so that it does not move up in the axial direction from the rotor case 10, without being bonded.

Furthermore, because the retaining flange 60A is provided at the top face of the clamping magnet 30, a disc drive device can be produced that is provided with a reliable spindle motor, wherein the clamping magnet is reliably prevented from coming off from the rotor case.

Figure 19:
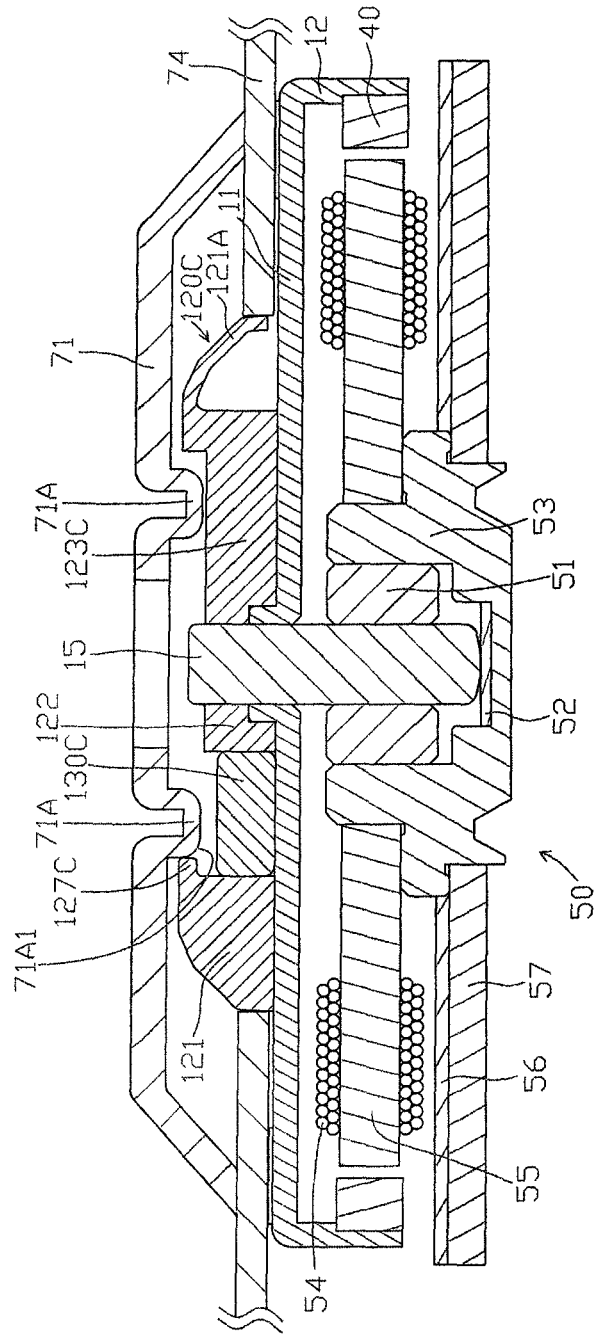
FIG. 19 is a sectional view of key elements of a disc drive device, which is provided with the spindle motor according to the fifth embodiment of the present invention.

Furthermore, if a convex rounded portion 71A2 is formed between the inner circumference of the annular protrusion 71A and the bottom portion that continues on the inner circumference thereof, when the clamper 71 is moved down in the axial direction from above the disc 74, the clamper 71 is smoothly brought into contact with the flange 60A, and thus a disc drive device that can easily perform centering can be produced FIG. 19 is a sectional view of key elements of a disc drive device, which is provided with the spindle motor according to the fifth mode of embodiment of the present invention. In FIG. 19, reference numerals that are the same as the reference numerals in FIG. 1 to FIG. 18 indicate the same members, and thus detailed descriptions are omitted.

With the centering member 120C of the disc drive device shown in FIG. 19, the center of the inscribed circle, which touches the tips of the three projections 127C, is the center of rotation, and the outer circumference of an annular protrusion 71A is the same size as the inscribed circle. Thus, when the clamper 71 is moved down in the axial direction from above a disc, the outer circumference of the annular protrusion 71A touches the tips of the projections 127C of the centering member 120C so as to be centered. Thus, the projections have a centering function for the clamper, so that a disc drive device is produced with which there is no eccentricity when the clamper, which is disposed on the top face of the disc, rotates. No less than three projections are preferable for forming the inscribed circle, which is inscribed at the tips thereof.

Furthermore, the annular protrusion 71A of the centered clamper 71 is disposed opposite to, and not in contact with, the top faces of a plurality of segmented magnets so that a clearance is provided. Consequently, when the clamper is moved up in the axial direction so as to be separated from the plurality of segmented magnets, because there is the aforementioned clearance, the attractive force between the plurality of segmented magnets and the annular protrusion 71A is weaker than the attractive force between the plurality of segmented magnets and the rotor case, and the plurality of segmented magnets can be prevented from moving upward in the axial direction from the rotor case. Moreover, because a centering member in this example is provided with the retaining projections 127C, a disc drive device can be produced that is provided with a reliable spindle motor, in which the plurality of segmented magnets are reliably prevented from coming off from the rotor case.

Furthermore, if a convex rounded portion 71A1 is formed between the inner circumference of the annular protrusion 71A and the bottom portion that continues on the inner circumference thereof, when the clamper 71 is moved down in the axial direction from above a disc, the clamper is smoothly brought into contact with the projections, and thus a disc drive device that can easily perform centering is produced.

Figure 20:
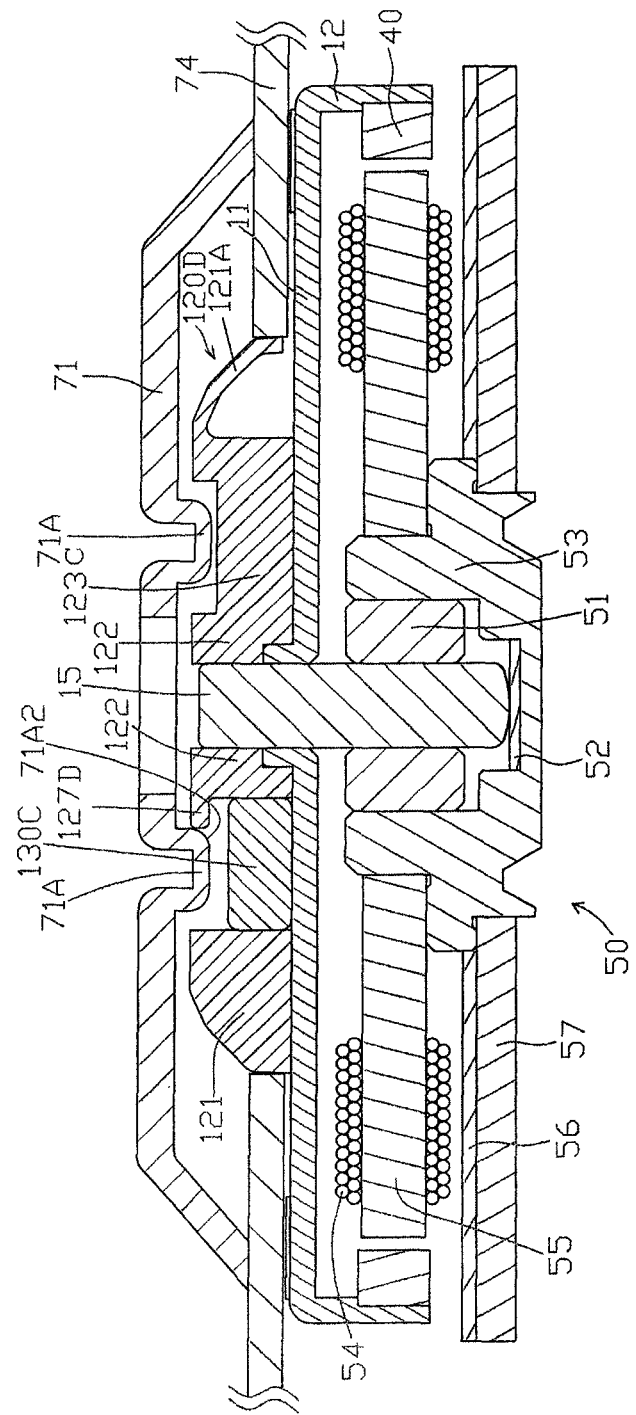
FIG. 20 is a sectional view of key elements of a disc drive device, which is provided with the spindle motor according to the sixth embodiment of the present invention.

FIG. 20 is a sectional view of key elements of a disc drive device, which is provided with a spindle motor according to the sixth embodiment of the present invention. In FIG. 20, reference numerals that are the same as the reference numerals in FIG. 1 to FIG. 19 indicate the same members, and thus detailed descriptions are omitted.

With a centering member 120D of the disc drive device shown in FIG. 20, the center of the circumscribed circle, which passes the tips of three projections 127D, is the center of rotation, and the inner circumference of an annular protrusion 71A is the same size as the circumscribed circle. Thus, when a clamper 71 is moved down in the axial direction from above a disc, the inner circumference of the annular protrusion 71A is brought into contact with the tips of the projections 127D of the centering member 120D so as to be centered. Thus, the projections have a centering function for a clamper, so that a disc drive device is produced with which there is no eccentricity when the clamper, which is disposed on the top face of the disc, rotates. No less than three projections are preferable for forming the circumscribed circle, which passes the tips.

Furthermore, the annular protrusion 71A on the centered clamper 71 is disposed opposite to, and not in contact with, the top faces of the plurality of segmented magnets so that a clearance is provided. Consequently, when the clamper is moved up in the axial direction so as to be separated from the plurality of segmented magnets, because there is the aforementioned clearance, the attractive force between the plurality of segmented magnets and the annular protrusion 71A is weaker than the attractive force between the plurality of segmented magnets and a rotor case, and the plurality of segmented magnets can be prevented from moving up in the axial direction from the rotor case.

Moreover, because the centering member is provided with the retaining projections 127D, a disc drive device can be produced that is provided with a reliable spindle motor, with which the plurality of segmented magnets is reliably prevented from coming off from the rotor case.

Furthermore, if a convex rounded portion 71A2 is formed between the inner circumference of the annular protrusion 71A and the bottom portion that continues the inner circumference thereof, when the clamper is moved down in the axial direction from above a disc, the clamper is smoothly brought into contact with the projections on the centering member, so that a disc drive device that can easily perform centering is provided.

Figure 21:
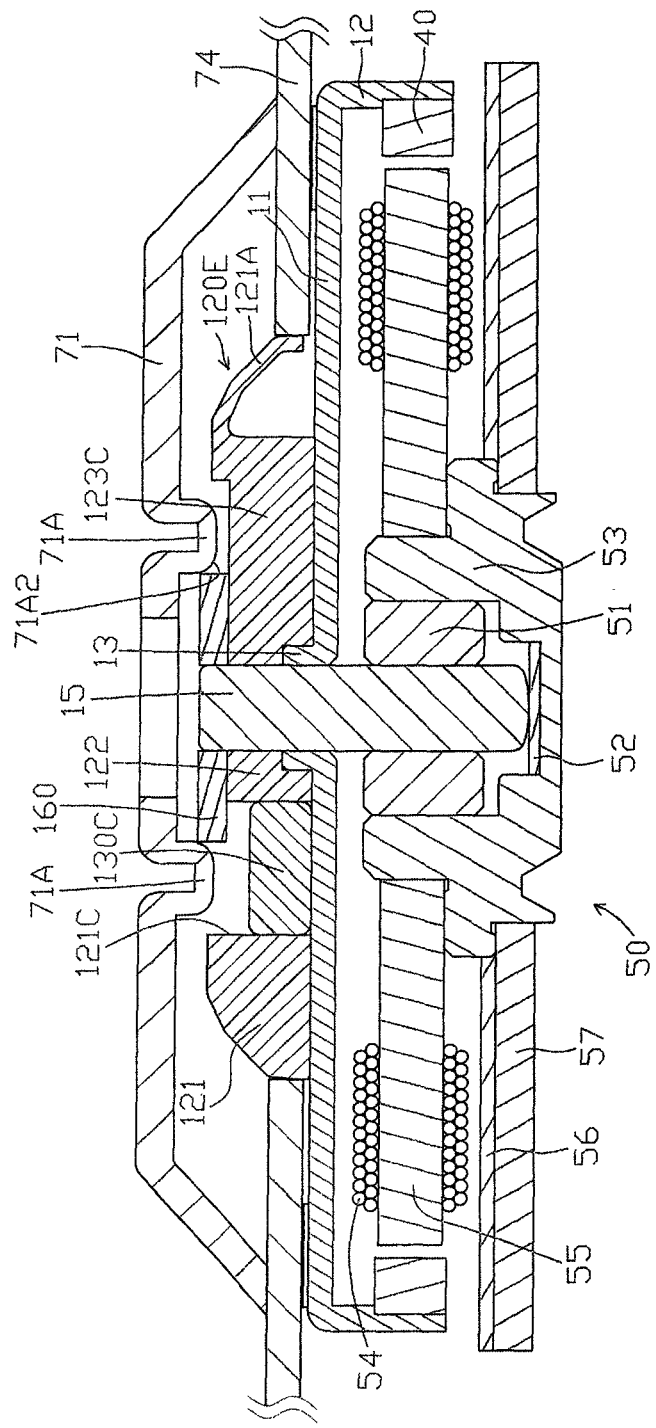
FIG. 21 is a sectional view of key elements of a disc drive device, which is provided with the spindle motor according to the seventh embodiment of the present invention.
Figure 22:
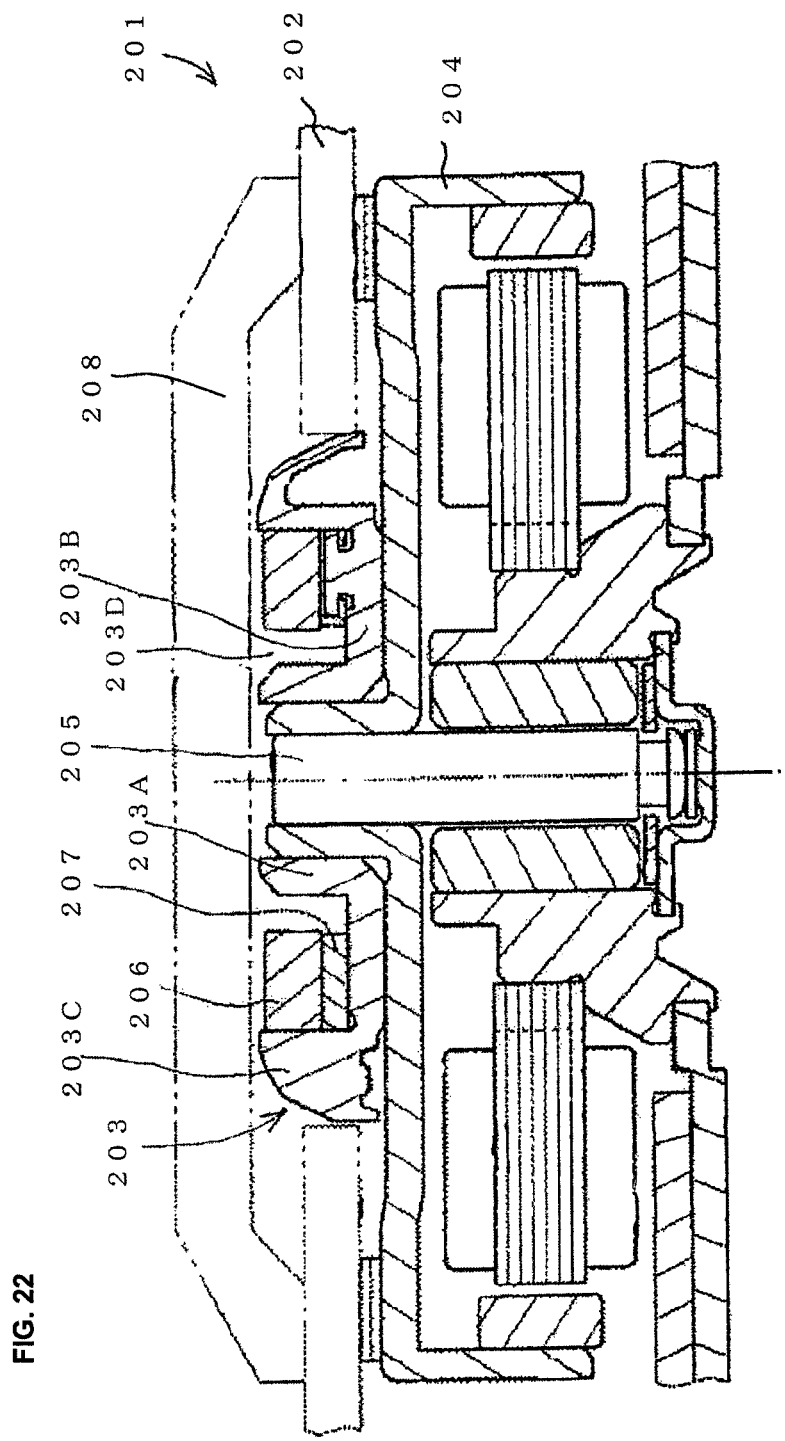
FIG. 22 is a sectional view of a conventional spindle motor.

FIG. 21 is a sectional view of key elements of a disc drive device, which is provided with a spindle motor according to the seventh embodiment of the present invention. In FIG. 21, reference numerals that are the same as the reference numerals in FIG. 1 to FIG. 20 indicate the same members, and thus detailed descriptions are omitted.

With the disc drive device shown in FIG. 21, the center of the outer diameter of a cylinder member 160 is the same as the center of rotation, and the inner circumference (inner diameter) of an annular protrusion 71A is the same size as the outer diameter of the cylinder member 160. Consequently, the clamper is above a disc, and when moved down in the axial direction, the inner circumference of the annular protrusion 71A of the clamper is brought into contact with the outer circumference of cylinder member 160 so as to be centered. Thus, the cylinder member 160 has a centering function for the clamper, so that a disc drive device is produced with which there is no eccentricity when the clamper, which is disposed on the top face of the disc, rotates.

Furthermore, the annular protrusion 71A on the centered clamper 71 is disposed opposite to, and not in contact with, the top faces of the plurality of segmented magnets, so that a clearance is provided. Consequently, when the clamper is moved up in the axial direction so as to be separated from the plurality of segmented magnets, because there is the aforementioned clearance, the attractive force between the plurality of segmented magnets and the annular protrusion 71A is weaker than the attractive force between the plurality of segmented magnets and the rotor case, and the plurality of segmented magnets can be prevented from moving in the axial direction from the rotor case.

Furthermore, because the retaining cylinder member 160 is provided, a disc drive device can be produced that is provided with a reliable spindle motor, with which the plurality of segmented magnets are reliably prevented from coming off from the rotor case.

Furthermore, if a convex rounded portion 71A2 is formed between the inner circumference of the annular protrusion 71 and the bottom portion that continues on the inner circumference thereof, when the clamper is moved down in the axial direction from above a disc, the clamper is smoothly brought into contact with the cylindrical member, and thus a disc drive device that can easily perform centering is provided.

DESCRIPTION OF REFERENCE NUMERALS 1 spindle motor
10 rotor case
11 top face plate
12 first cylindrical part
13 second cylindrical part
14 through-hole
15 rotational shaft
16 slip prevention member
20A centering member
20B centering member
21 through-opening
23 claw
24 bottom face
25 inner circumference
26 protrusion
27 projection
30 clamping magnet
40 drive magnet
50 stator
51 radial bearing
52 thrust bearing
53 bearing holder
54 coil
55 stator core
56 circuit board
57 stator base
60 cylinder member 60A flange
70 disc drive device
71 clamper
71A annular protrusion
71A1 rounded portion
71A2 rounded portion
72 recording and playback unit
73 case
74 disc
120A centering member
120B centering member
120C centering member
120D centering member
121 annular guide
121A claw
121B bottom face
121C inner circumference
122 boss
123A bridge
123B bridge
123C bridge
124 through-opening
127C projection
127D projection
130A clamping magnet (annular magnet)
130B clamping magnet (annular magnet)
130B1 recess
130C clamping magnet (plurality of segmented magnets)
160 cylinder member
160A flange

What is claimed is:
1. A spindle motor comprising:
a turntable on which a disc is loaded,
a motor which rotates said turntable, wherein a top face plate of a magnetic body rotor case, which rotates united with a rotational shaft of said motor, serves as said turntable,
a centering member that guides an inner edge of the disc so as to be concentric with said rotational shaft is disposed on a top face plate of said rotor case, and
a clamping magnet disposed in a through-opening on an interior of said centering member and is in contact with the top face plate of said rotor case;
wherein said clamping magnet comprises an annular magnet;
wherein the inner circumference of said centering member is in contact with the outer circumference of said clamping magnet;
wherein said rotational shaft has a protruding portion that protrudes from the top face plate of said rotor case, a cylinder member is fixed around said protruding portion, and the inner circumference of said clamping magnet is in contact with the outer circumference of said cylinder member, and the clamping magnet is disposed concentrically with said rotational shaft; and
wherein said cylinder member has a flange that protrudes radially at the top outer circumference, and said flange faces, in the axial direction, the top face of said clamping magnet.

2. A disc drive device that is provided with the spindle motor according to claim 1, the disc drive device comprises a damper, which is disposed on the top face of said disc, and is attracted toward said rotor case by said clamping magnet, wherein said clamper has an annular protrusion that protrudes from the bottom face, and is positioned so that the inner circumference of said annular protrusion contacts the outer circumference of the flange on said cylinder member.

3. A spindle motor comprising:
a turntable on which a disc is loaded,
a motor which rotates said turntable, wherein a top face plate of a magnetic body rotor case, which rotates united with a rotational shaft of said motor, serves as said turntable,
a centering member that guides an inner edge of the disc so as to be concentric with said rotational shaft is disposed on a top face plate of said rotor case, and
a clamping magnet disposed in a through-opening on an interior of said centering member and is in contact with the top face plate of said rotor case; and
wherein said centering member is provided with a projection that faces, in the axial direction, the top face of said clamping magnet.

4. A disc drive device that is provided with the spindle motor according to claim 3, the disc drive device comprises a clamper, which is disposed on the top face of said disc, and is attracted toward said rotor case by said clamping magnet, wherein said clamper, which has an annular protrusion that protrudes from the bottom face, is positioned so that the outer circumference of said annular protrusion contacts the tip of the projection on said centering member.

5. The spindle motor recited in claim 3, wherein said clamping magnet comprises an annular magnet and is disposed concentrically with said rotational shaft.

6. The spindle motor recited in claim 5, wherein the inner circumference of said centering member is in contact with the outer circumference of said clamping magnet.

7. The spindle motor recited in claim 6, wherein said rotational shaft has a protruding portion that protrudes from the top face plate of said rotor case, a cylinder member is fixed around said protruding portion, and the inner circumference of said clamping magnet is in contact with the outer circumference of said cylinder member, and the clamping magnet is disposed concentrically with said rotational shaft.

8. The spindle motor recited in claim 7, wherein said cylinder member has a flange that protrudes radially at the top outer circumference, and said flange faces, in the axial direction, the top face of said clamping magnet.

9. A spindle motor comprising:
a turntable on which a disc is loaded,
a motor which rotates said turntable, wherein a top face plate of a magnetic body rotor case, which rotates united with a rotational shaft of said motor, serves as said turntable,
a centering member that guides an inner edge of the disc so as to be concentric with said rotational shaft is disposed on a top face plate of said rotor case, and
a clamping magnet disposed in a through-opening on an interior of said centering member and is in contact with the top face plate of said rotor case; and
wherein said centering member comprises an annular guide that guides the inner edge of said disc, a boss that is disposed in the center of said annular guide, mounted around said rotational shaft, and a plurality of bridges that connect said annular guide and said boss, and wherein said through-opening is formed between said annular guide and said boss.

10. The spindle motor according to claim 9, wherein said clamping magnet comprises an annular magnet, and is disposed under said bridges.

11. The spindle motor according to claim 9, wherein said clamping magnet comprises an annular magnet, on the bottom face of which a recess is formed, and said clamping magnet is disposed on top of said bridges with said recess fitting with said bridges.

12. The spindle motor according to claim 9, wherein said clamping magnet comprises a plurality of segmented magnets that are segmented in the rotational direction, said plurality of segmented magnets being disposed with gaps therebetween, and said bridges being disposed in said gaps.

13. The spindle motor according to claim 12, wherein said plurality of segmented magnets are arcuate magnets and are disposed in an annular shape with said gaps therebetween.

14. The spindle motor according to claim 12, wherein said centering member is provided with projections that face, in the axial direction, the top faces of said plurality of segmented magnets.

15. A disc drive device that is provided with the spindle motor recited in claim 14, wherein the disc drive device comprises a clamper, which is disposed on the top face of said disc, and is attracted toward said rotor case by said clamping magnet, wherein said projections are provided on the inner circumference of said annular guide, and said clamper has an annular protrusion that protrudes from the bottom face, and is positioned so that the outer circumference of said annular protrusion contacts the tips of said projections.

16. A disc drive device that is provided with the spindle motor recited in claim 14, wherein the disc drive device comprises a clamper, which is disposed on the top face of said disc, and is attracted toward said rotor case by said clamping magnet, wherein said projections are provided on the outer circumference of said boss, and said clamper has an annular protrusion that protrudes from the bottom face, and is positioned so that the inner circumference of said annular protrusion contacts the tips of said projections.

17. The spindle motor according to claim 12, wherein said rotational shaft has a protruding portion that protrudes from the top face plate of said rotor case, a cylinder member is fixed around said protruding portion, and said cylinder member faces, in the axial direction, the top faces of said plurality of segmented magnets.

18. A disc drive device that is provided with the spindle motor recited in claim 17, wherein the disc drive device comprises a clamper, which is disposed on the top face of said disc, and is attracted toward said rotor case by said clamping magnet, wherein said clamper has an annular protrusion that protrudes from the bottom face, and is positioned so that the inner circumference of said annular protrusion contacts the outer circumference of said cylinder member.

* * * * *